Oct. 10, 1961　　　J. BOYCE ET AL　　　3,003,610
FRUIT HANDLING MACHINE
Filed Jan. 7, 1959　　　　　　　　　　　　　　　15 Sheets-Sheet 12
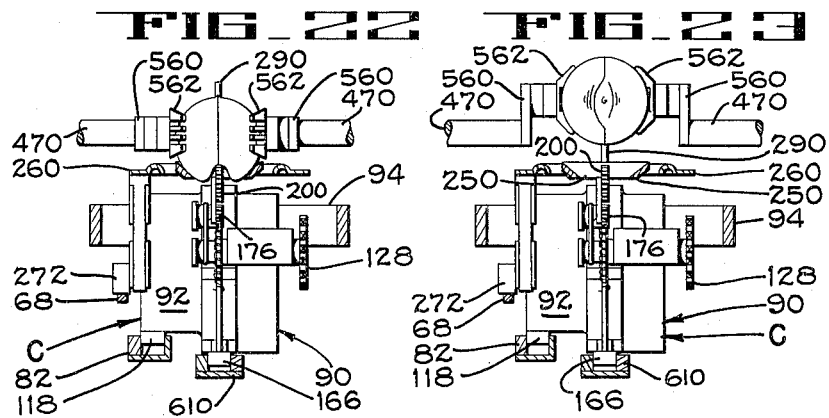
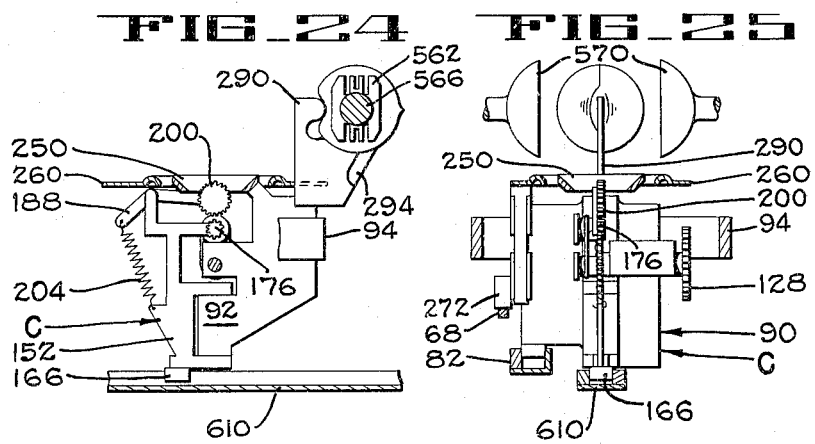
INVENTORS
JOHN BOYCE
LESLIE VADAS
BY Hans G. Hoffmeister
ATTORNEY Oct. 10, 1961 J. BOYCE ET AL 3,003,610
FRUIT HANDLING MACHINE
Filed Jan. 7, 1959 15 Sheets-Sheet 13
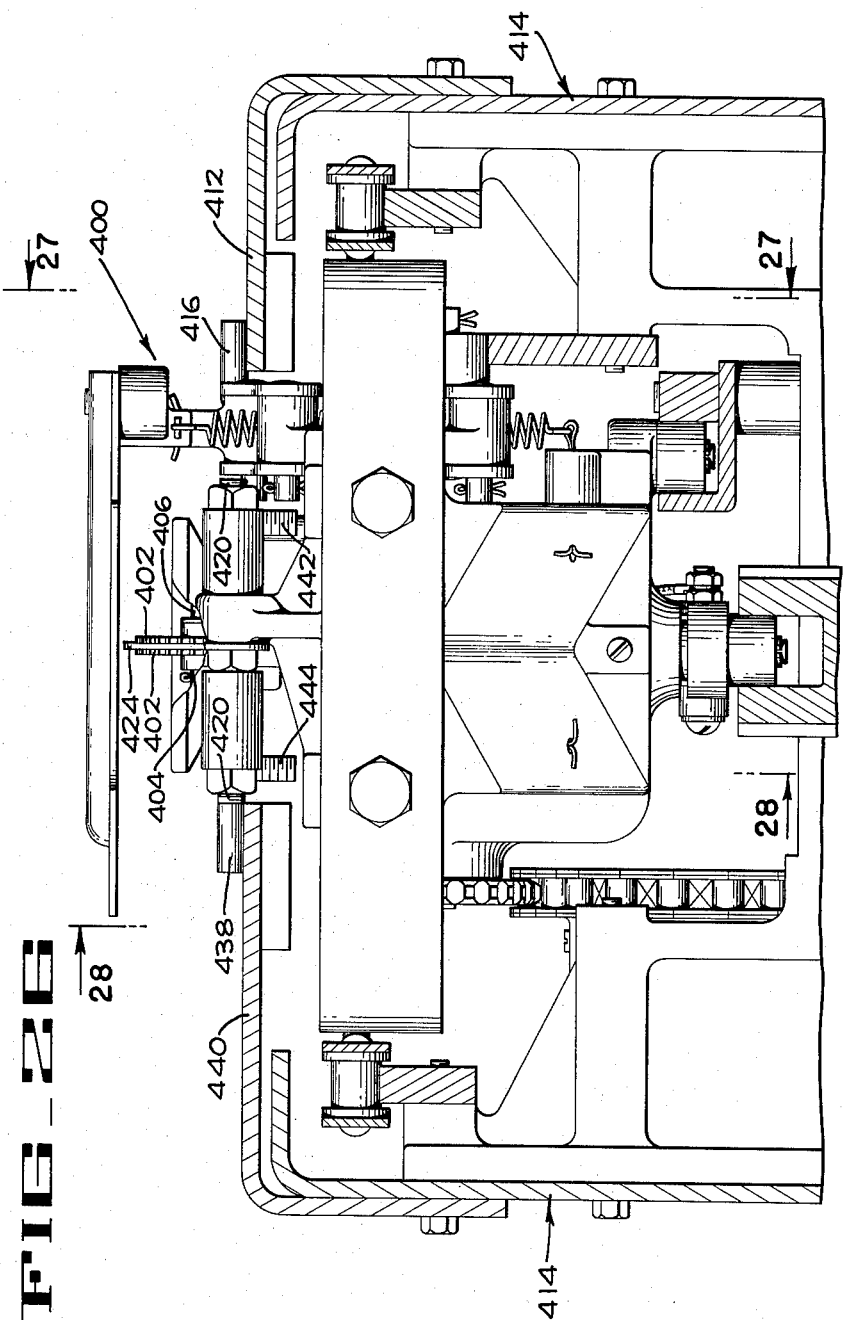
FIG_26
INVENTORS
JOHN BOYCE
LESLIE VADAS
BY *Hans G. Hoffmeister*
ATTORNEY

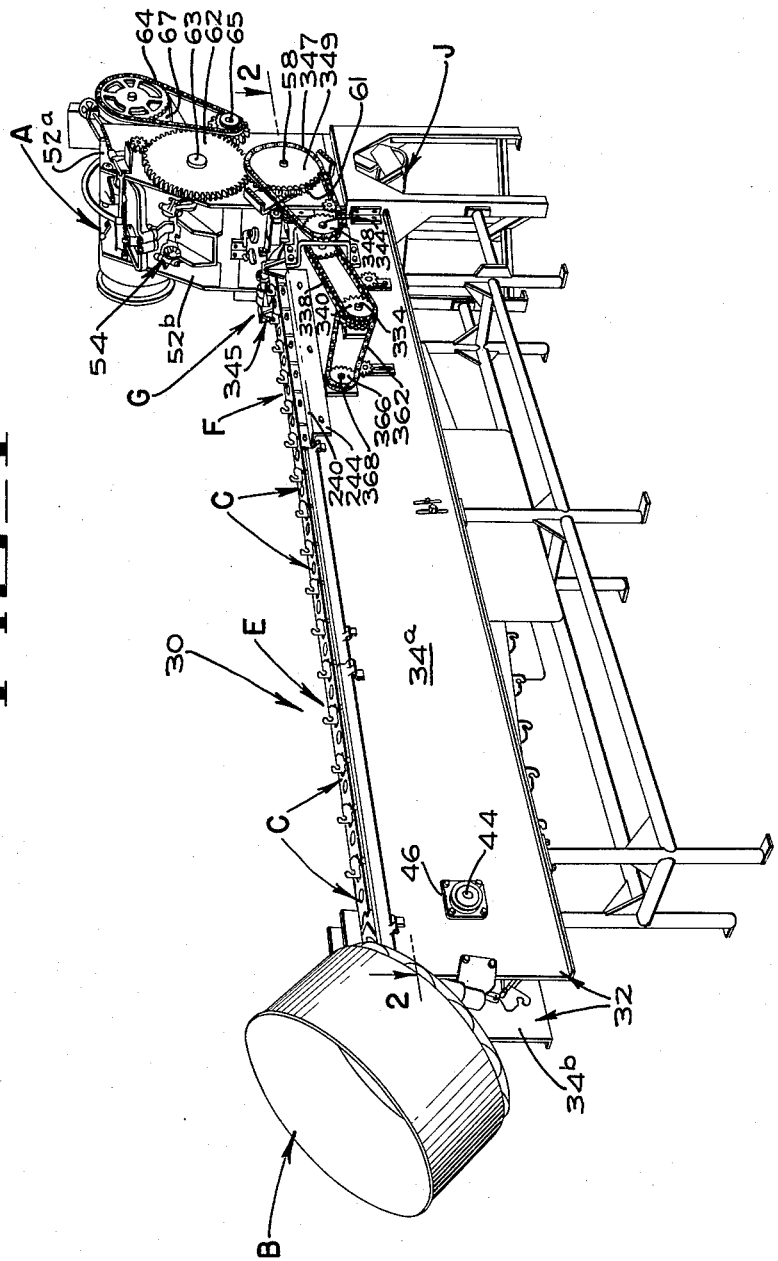

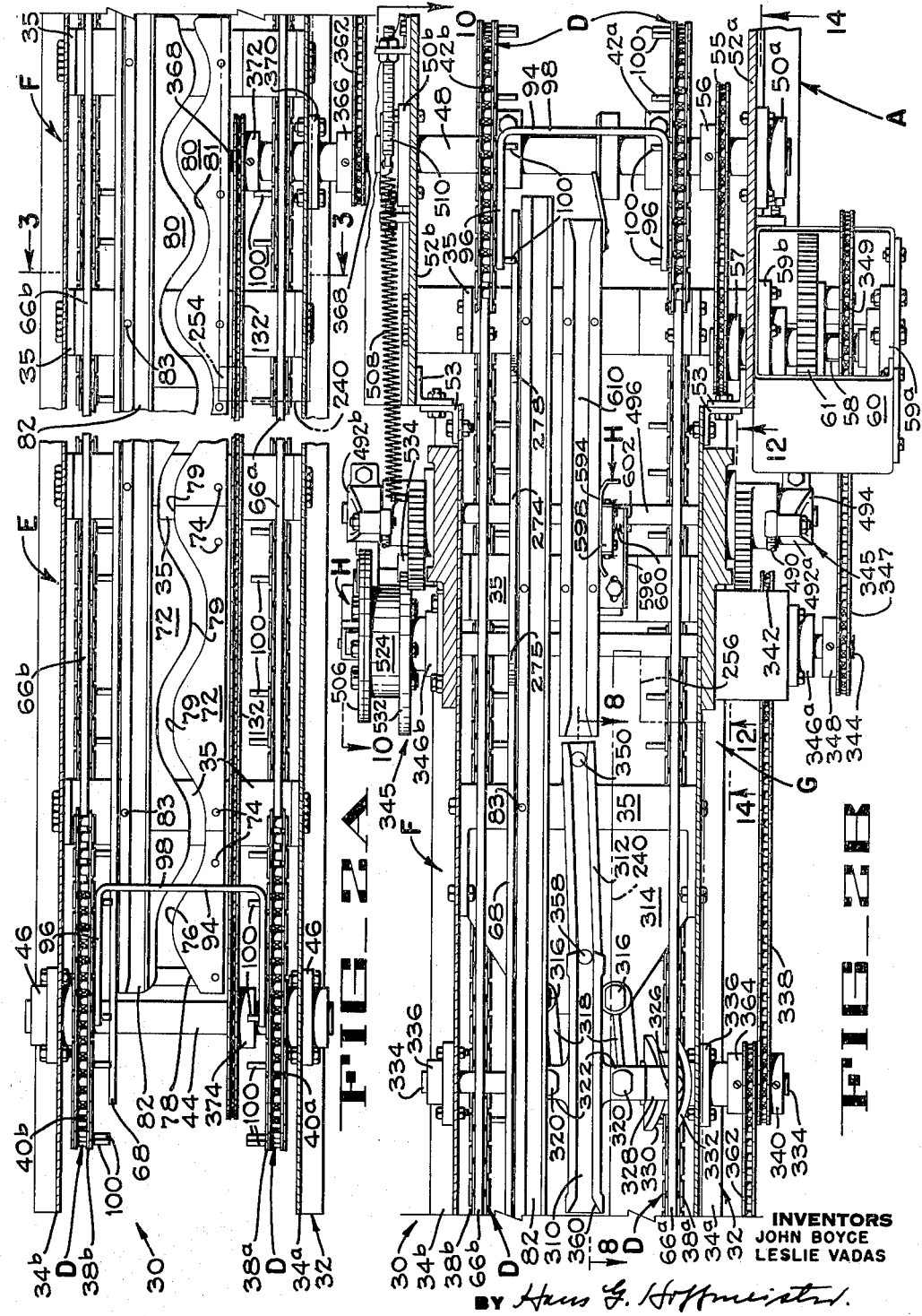

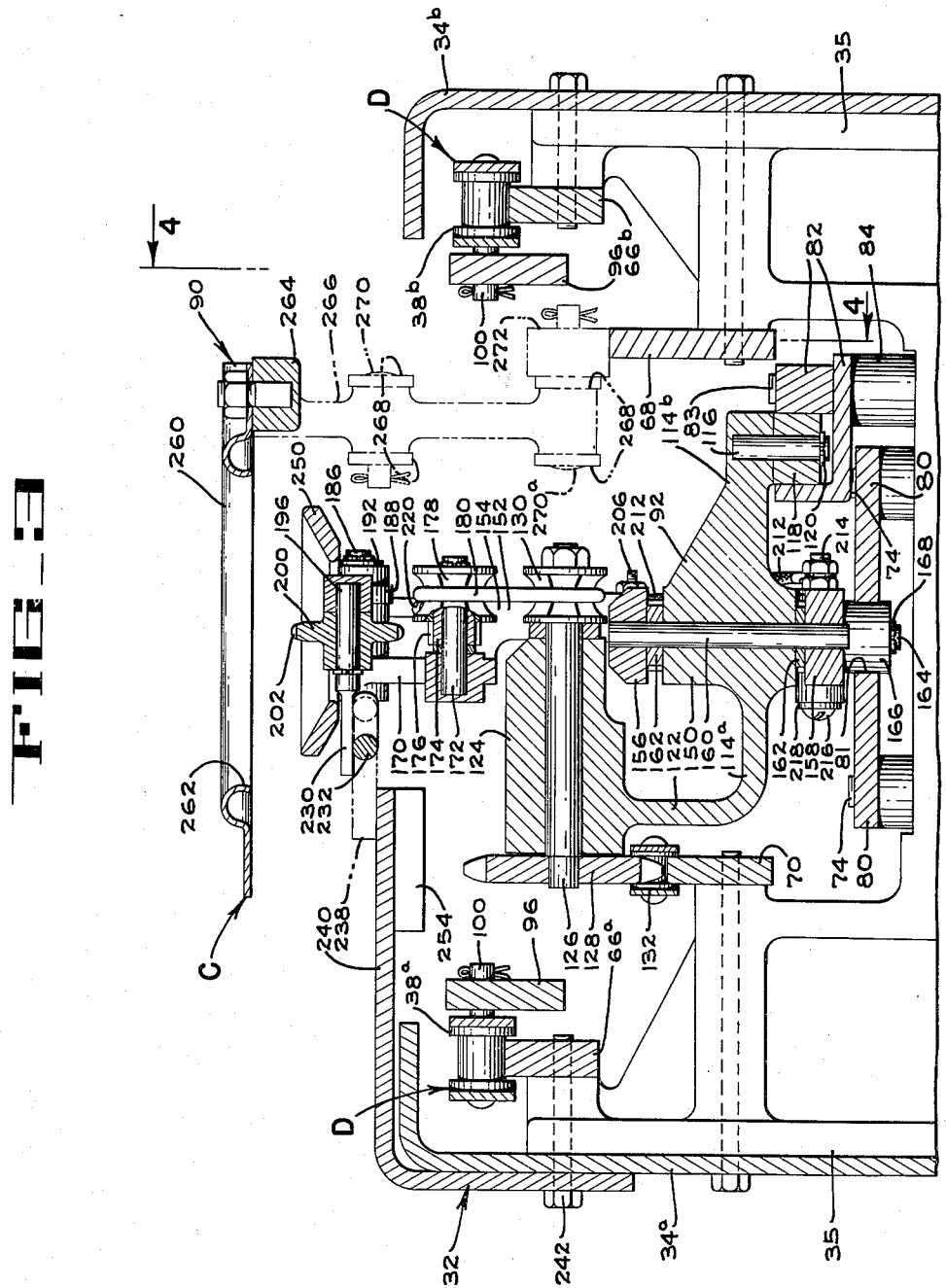

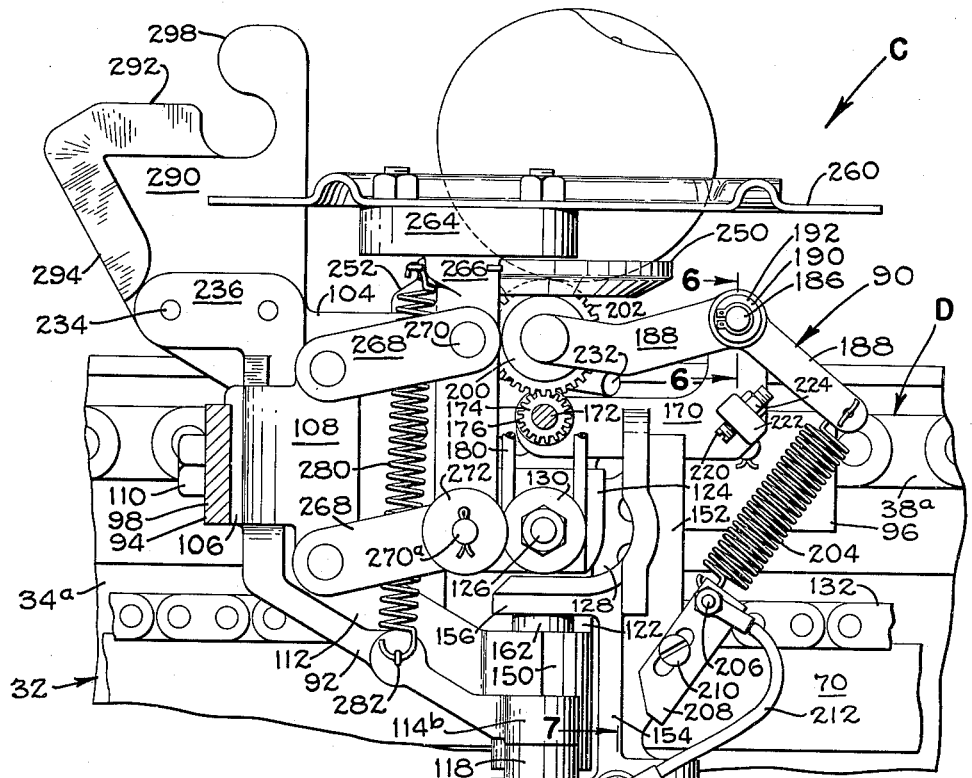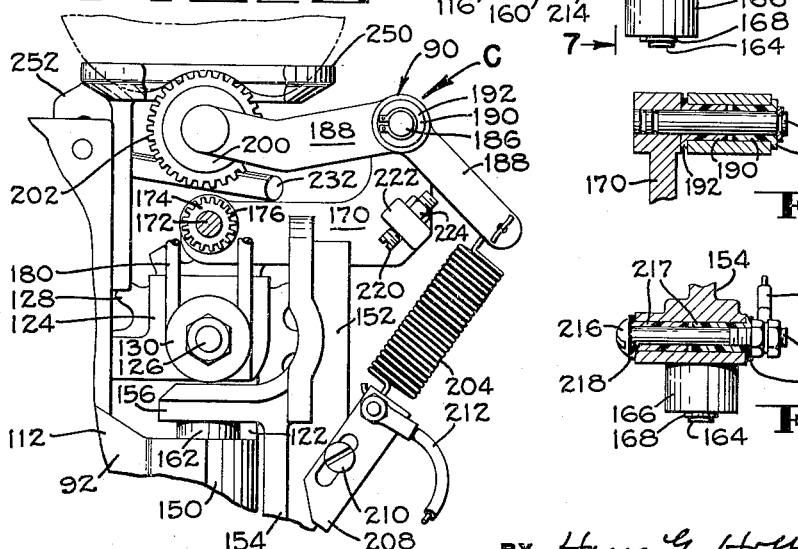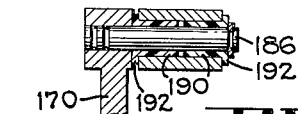

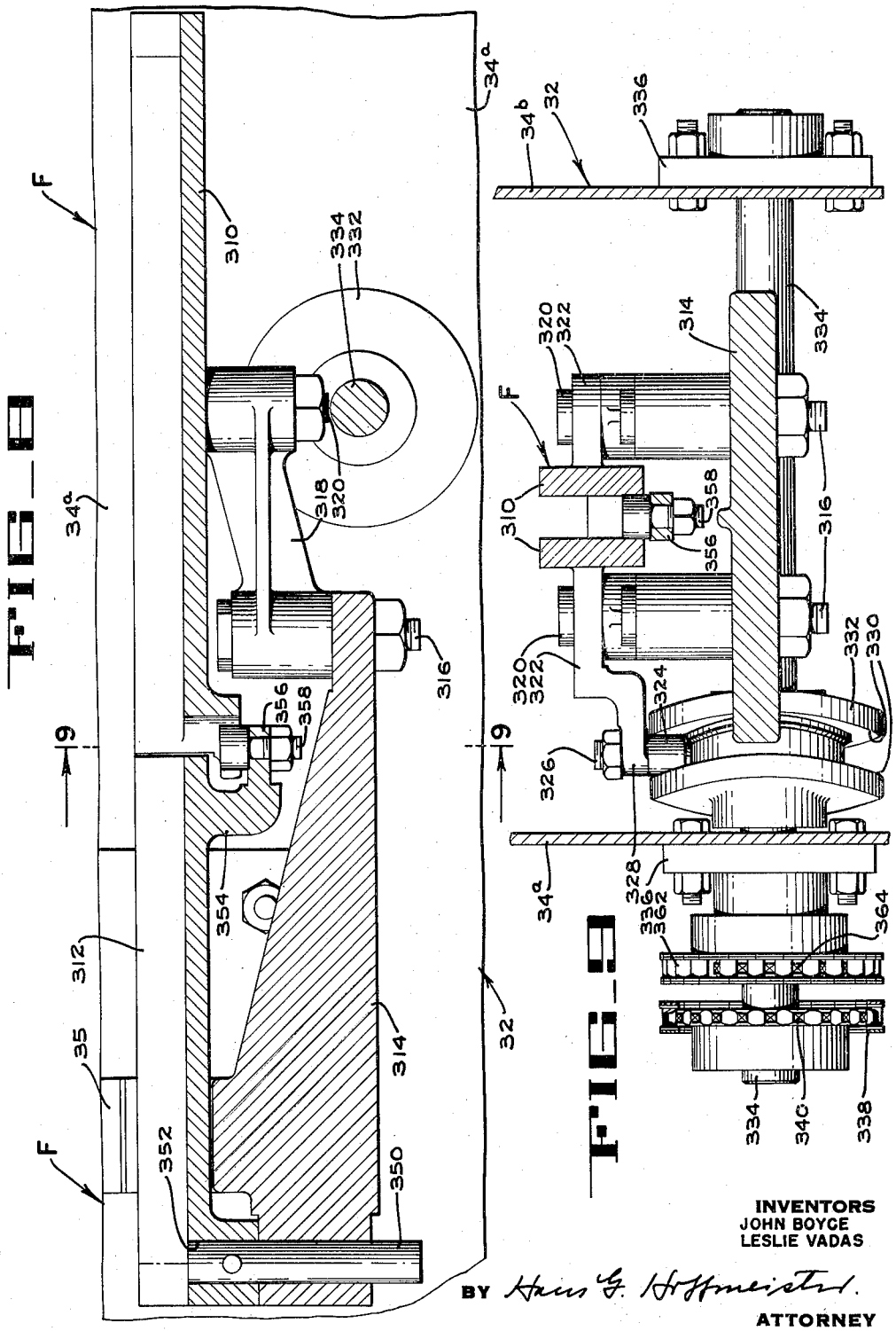

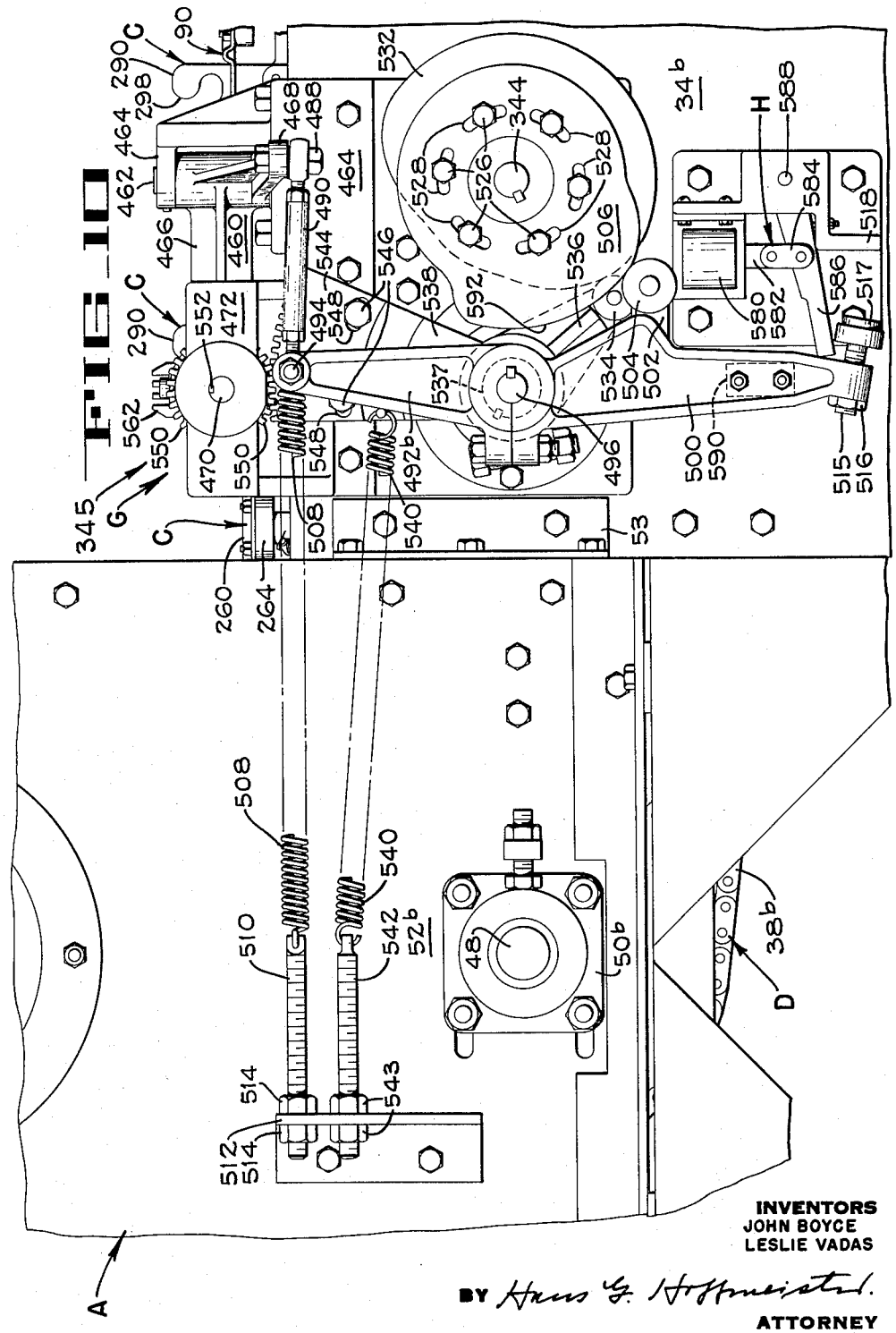

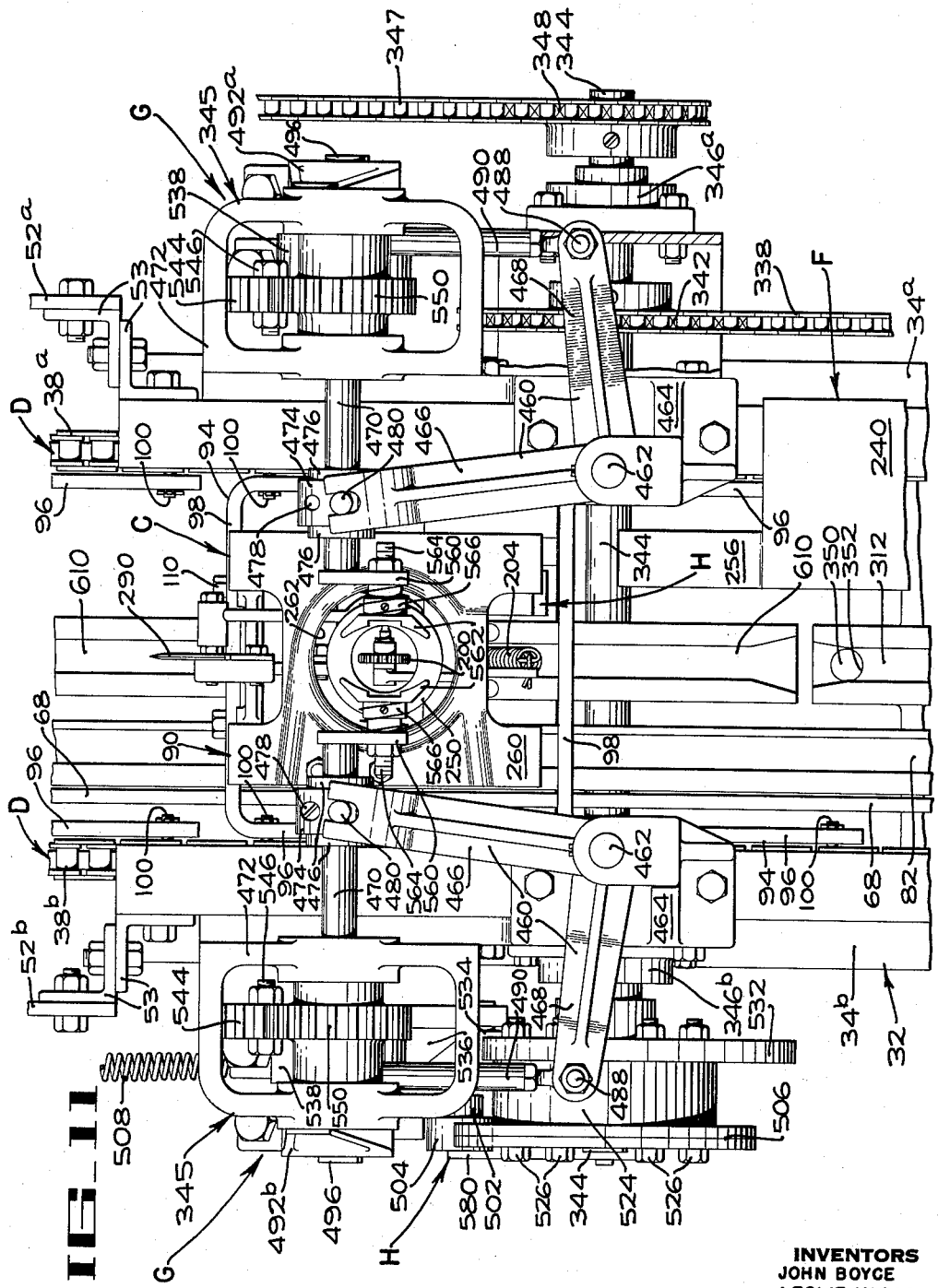

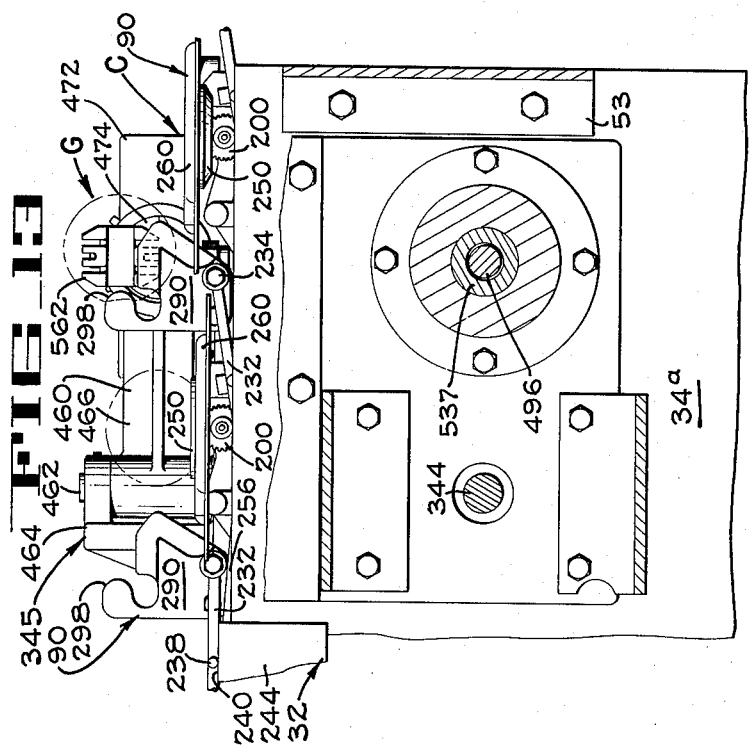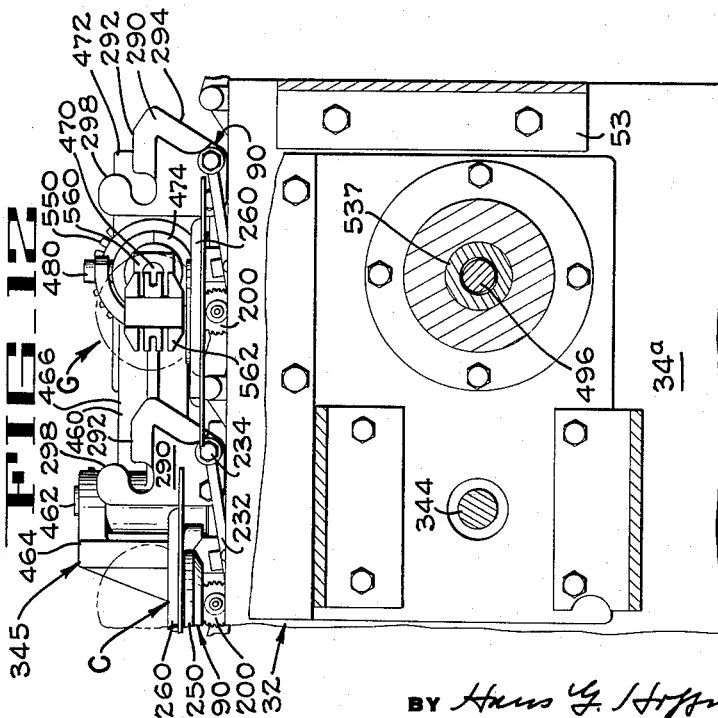

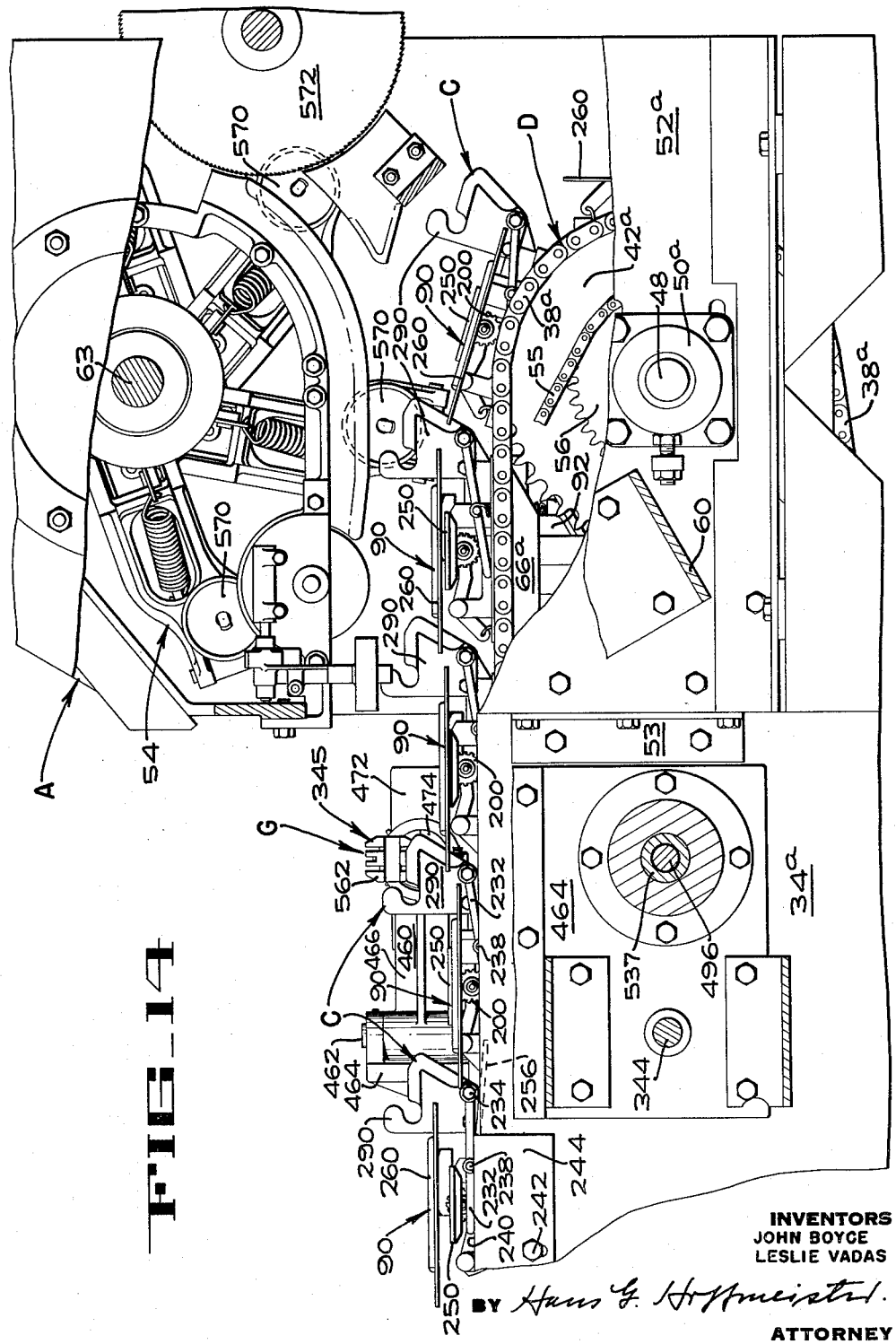

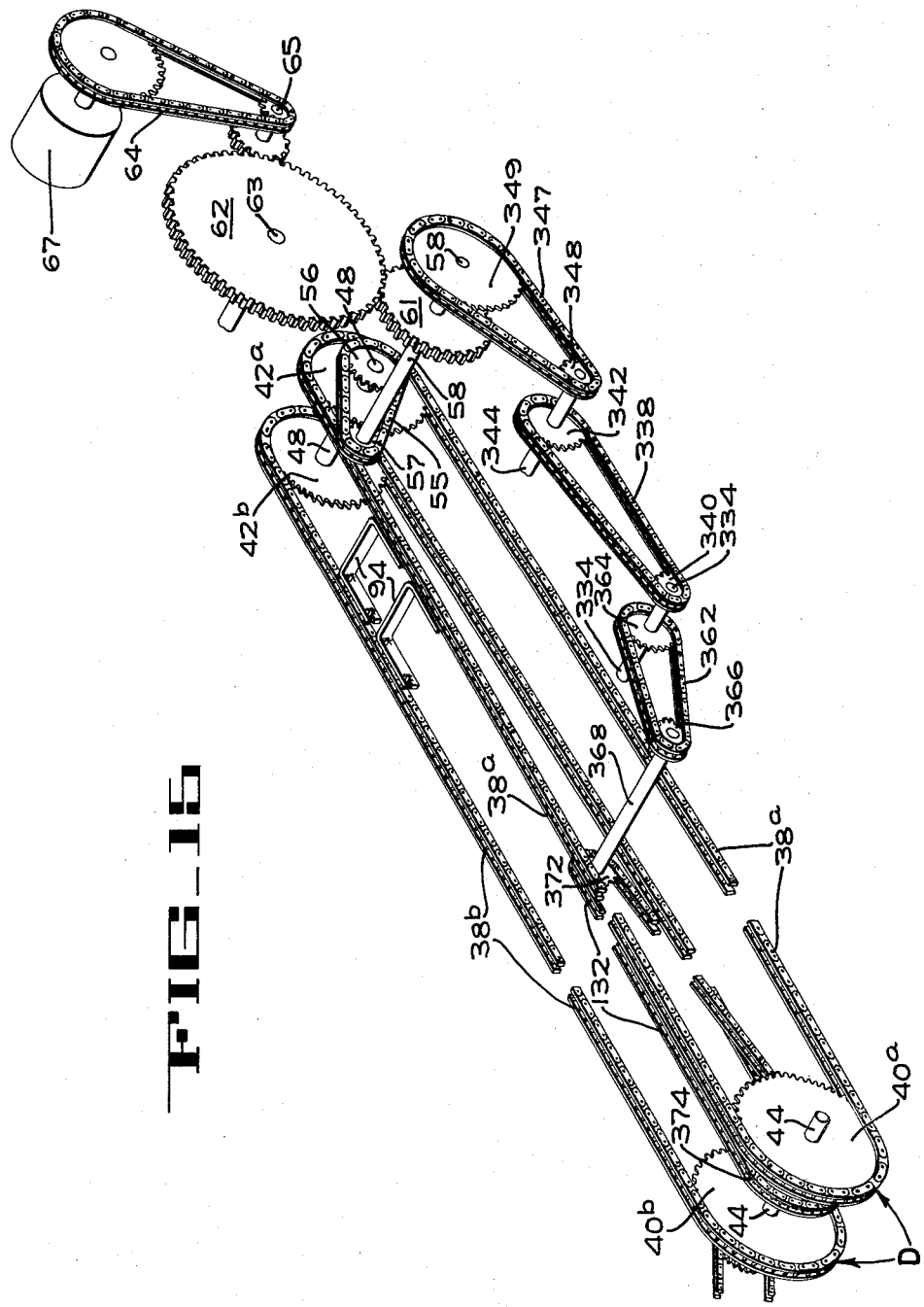

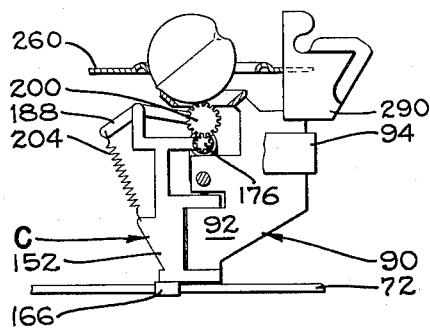
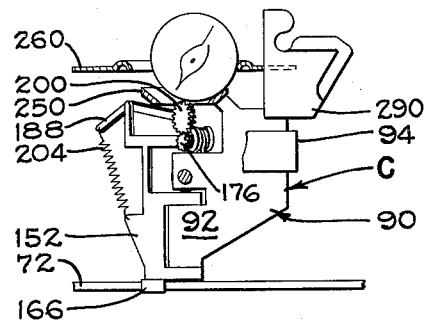
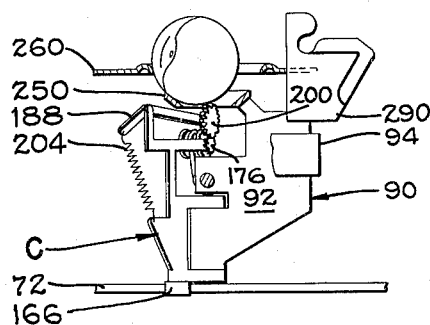
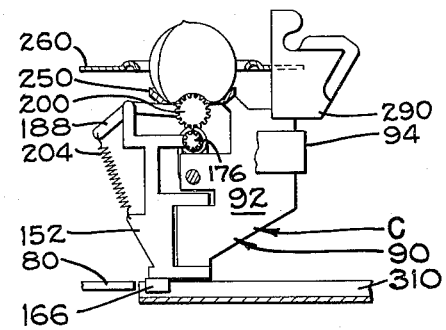
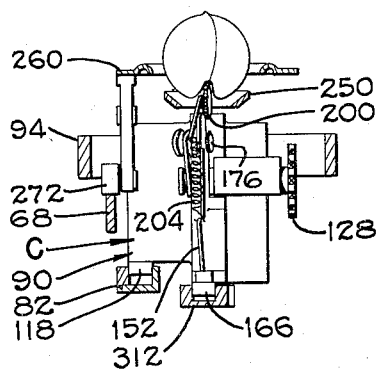
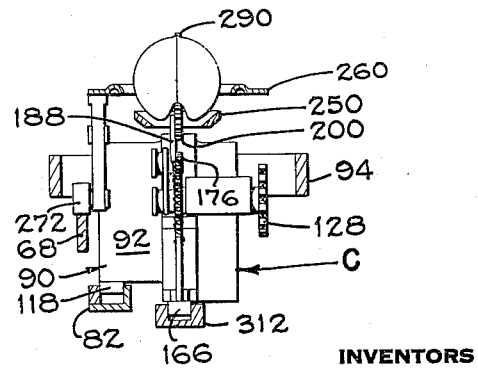

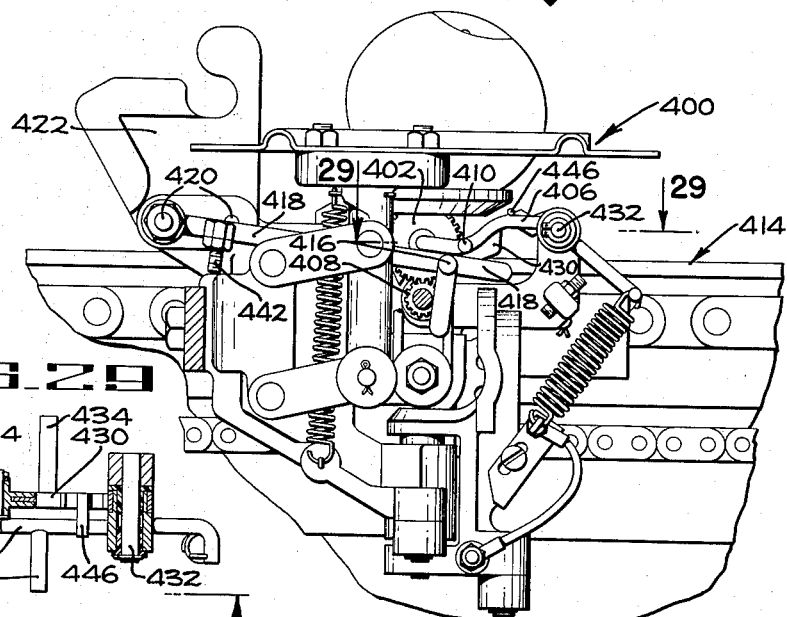
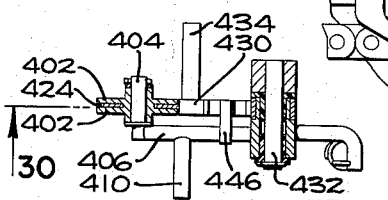
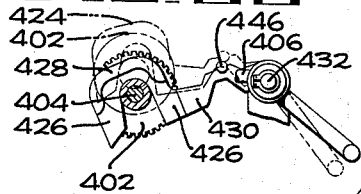
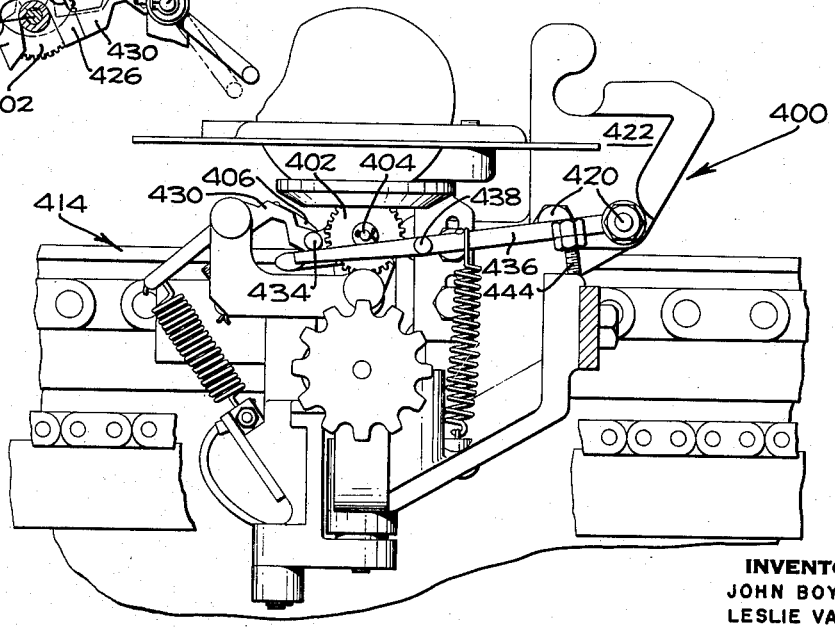
INVENTORS
JOHN BOYCE
LESLIE VADAS
ATTORNEY

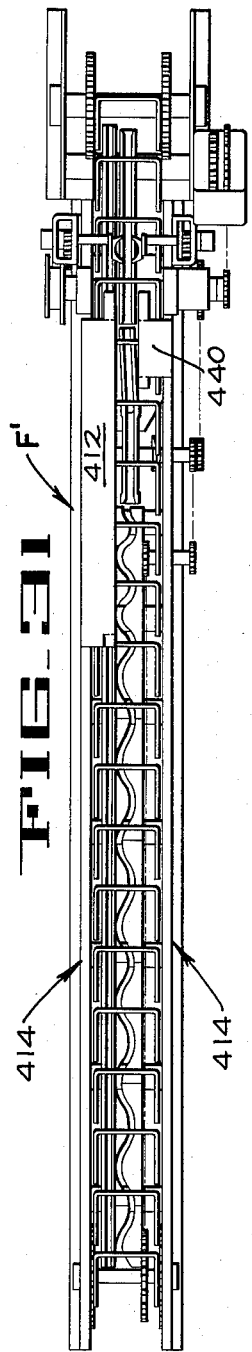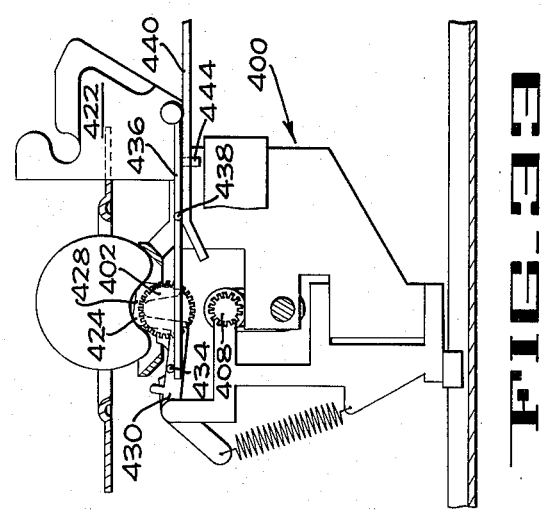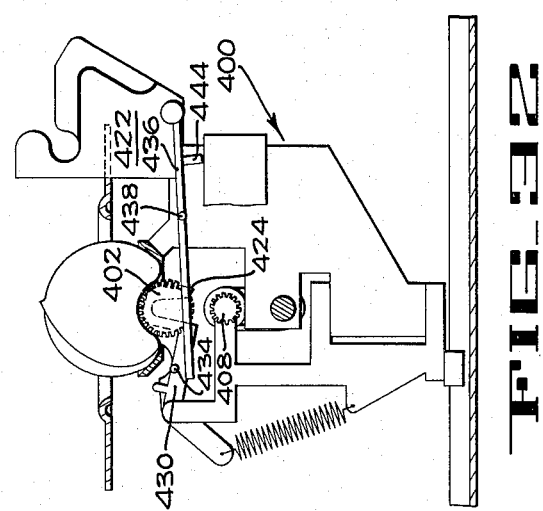

United States Patent Office 3,003,610
Patented Oct. 10, 1961

3,003,610
FRUIT HANDLING MACHINE
John Boyce, San Jose, and Leslie Vadas, Los Gatos, Calif., assignors to FMC Corporation, a corporation of Delaware
Filed Jan. 7, 1959, Ser. No. 785,414
30 Claims. (Cl. 198—33)

This invention relates to fruit processing equipment, and more particularly to a machine for orienting fruit and for transferring it in oriented position to another machine for further processing.

An object of the present invention is to provide an improved fruit processing machine.

Another object is to provide an improved fruit orienting mechanism.

Another object of the invention is to provide an improved fruit transfer mechanism.

Another object is to provide an improved mechanism for rejecting improperly oriented fruit.

Another object is to provide a fruit processing machine including an orienting mechanism, a rejecting mechanism, and a transfer mechanism that cooperate with each other in a manner that enables the entire processing machine to operate rapidly, positively and smoothly.

Another object is to provide a mechanism for orienting indented fruit such as peaches or apricots with regard to the indent thereof, which mechanism includes a positively driven device for continually turning a fruit to be oriented so as to subject different regions of the surface of the fruit to a scanning operation until the fruit is disposed in a position with its stem indent facing in a predetermined direction.

Another object is to provide a positively driven mechanism for effecting relative motion between a fruit scanner and a fruit to be oriented, in which the positive drive is interrupted when a desired orientation of the fruit with regard to its stem indent is attained.

Another object is to provide a fruit orienting machine in which a fruit to be oriented with regard to its stem indent is constantly rotated while being scanned and in which it is the scanning device itself that imposes upon the fruit the torque that causes rotation of the fruit.

Another object of the invention is to provide a positively driven fruit rotating element which functions, likewise, as the indent finder by entering into the stem indent of the fruit upon attainment of registry of the stem indent with the rotating element, and which, as a consequence of the movement of the rotating element into the indent, disconnects the positive drive and thus contributes to the surety with which the fruit is retained in position with its stem indent facing toward the finder.

Another object is to provide means for repeatedly changing the plane of rotation of the fruit during the process of orienting the fruit as to its stem indent, so as to increase the probability of, and to decrease the time required for, attainment of registry of the indent with the indent finder.

Another object is to provide improved mechanism for vibrating the indent finder while it is entered into the stem indent of the fruit in supporting relation with the fruit, so as to attain highest efficiency of the mechanism in attaining orientation of the fruit with regard to its suture plane.

Another object of the invention is to provide a mechanism for individually transferring fruit from the orienting mechanism to another apparatus for further processing of the fruit, which transfer mechanism accurately centers the fruit with relation to the said other apparatus regardless of the overall size of the fruit and in spite of the fact that in the orienting mechanism the fruit is supported on a member that engages the exterior of the fruit.

Another object is the provision of a mechanism for rejecting improperly oriented fruit by merely disabling the transfer mechanism at the time that it otherwise would remove the fruit from an advancing orienting carriage, thus permitting the improperly oriented fruit to be carried to a destination different from that to which the transfer mechanism delivers properly oriented fruit.

These and other objects of the present invention will become apparent from the following description and the accompanying drawings, in which:

FIGURE 1 is a perspective of the fruit processing machine of the present invention viewed from a position adjacent the receiving end therof.

FIGURES 2A and 2B are views which, when placed end-to-end, constitute a partly broken away horizontal section of the fruit processing machine of the invention taken along lines 2—2 of FIG. 1 with the fruit advancing and orienting carriages removed.

FIGURE 3 is an enlarged fragmentary section along lines 3—3 of FIG. 2A and axially of one of the fruit advancing and orienting carriages mounted in operative relation thereon.

FIGURE 4 is a fragmentary section along lines 4—4 of FIG. 3, showing in side elevation one of the fruit advancing and orienting carriages but with the indent and suture plane finder element in an alternative position.

FIGURE 5 is a fragmentary view similar to FIG. 4 showing the finder element in still another operative position.

FIGURE 6 is a section along lines 6—6 of FIG. 4.

FIGURE 7 is a section along lines 7—7 of FIG. 4.

FIGURE 8 is an enlarged fragmentary section along lines 8—8 of FIG. 2B showing the cam for vibrating the indent finder and the drive mechanism therefor.

FIGURE 9 is a transverse section along lines 9—9 of FIG. 8.

FIGURE 10 is an enlarged fragmentary elevation viewed is indicated by the lines 10—10 of FIG. 2B to show the transfer mechanism.

FIGURE 11 is a plan of the transfer mechanism of FIG. 10.

FIGURE 12 is an enlarged fragmentary section along lines 12—12 of FIGURE 2B partly broken away to show the transfere mechanism in fruit receiving position.

FIGURE 13 is a view similar to FIG. 12 showing the transfer mechanism in an alternative position.

FIGURE 14 is an enlarged section along lines 14—14 of FIG. 2B partly broken away to show the relationship of the transfer mechanism of the invention to a machine to which the fruit is transferred for further processing.

FIGURE 15 is a schematic perspective of the power train for driving the operating components of the fruit handling machine of the invention.

FIGURES 16 to 25, inclusive, are sectional views partly diagrammatic, constituting a series of operational views showing successive steps in the orientation of a fruit and placement thereof in position for removal from the orienting mechanism by the transfer mechanism.

FIGURE 26 is a fragmentary transverse section similar to FIGURE 3, showing in end elevation a modified form fruit carrying and orienting carriage.

FIGURE 27 is a fragmentary longitudinal section along lines 27—27 of FIG. 26 showing the carriage in side elevation viewed from the left side.

FIGURE 28 is a view similar to FIG. 27, but taken along lines 28—28 of FIG. 26 to show the carriage in side elevation viewed from the right hand side.

FIGURE 29 is a fragmentary horizontal section along lines 29—29 of FIG. 27.

FIGURE 30 is a vertical section along lines 30—30 of FIG. 29.

FIGURE 31 is a diagrammatic plan of the orienting machine of the invention modified to accommodate the orienting carriage of FIG. 26.

FIGURES 32 and 33 are diagrammatic operational views showing consecutive steps of suture plane orientation as performed by the orienting carriage of FIG. 26.

General description

The fruit processing machine 30 (FIG. 1) of the present invention operates to orient spherical or spheroidal fruit such as peaches, apricots and certain species of apples so as to dispose the fruit with its stem-blossom axis vertical and with its stem indent in a downwardly facing position. In handling sutured fruit such as peaches and apricots, the machine 30 orients the fruit not only as to stem indent but also as to suture plane so that the fruit can be transferred from the orienting mechanism to a machine for further processing in the proper position to enable the machine that receives the fruit to function to the best advantage. For example, the processing machine 30 is illustrated in FIG. 1 as being operatively associated with a peach pitter A of well-known design, which, after cutting both the flesh portion and the pit portion of a peach in half severs each pit half from its associated half of the flesh portion. Consequently, the machine 30 of the invention will be considered herein as being intended to orient peaches, although it is to be understood that with little or no alteration and/or adjustment, it is likewise adapted to handle other fruit.

In order for the apparatus of the pitting operation to meet the specifications required for prime quality canned peach halves it is necessary for the peaches to be bisected along, or at least immediately adjacent, the suture plane of each peach. It is because of this requirement that it is desirable to deliver each peach to the pitting machine A so oriented that the bisecting saw of the pitting machine will sever the peach in a plane either coinciding with or immediately adjacent and parallel to the suture plane of the peach. The machine 30 of the invention is adapted to orient peaches both as to stem indent location and as to suture plane alignment and to deliver the peaches to a peach pitter in the optimum position for proper operation of the latter, with a high degree of efficiency and with a high percentage of accurately oriented peaches.

The machine 30 of the invention receives peaches in random positions and one at a time in rapid succession from a rotary feed hopper B (FIG. 1) which may be of conventional construction and therefore need not be described herein more fully than to have it explained that it is arranged and synchronized with the machine 30 to deposit one peach in each of a series of carriages C (FIGS. 1 and 3–5) that are progressed in rapid succession through the machine 30 by a conveyor D (FIGS. 2A, 2B and 3). The fruit is thus advanced successively through a zone E (FIGS. 1 and 2A) where it is oriented to dispose its stem-blossom axis vertical and its stem indent in a downwardly facing position, through a zone F (FIGS. 1, 2B, 8 and 9) where it is turned to align its suture plane with the direction of carriage advance, and to a transfer station G (FIGS. 1, 2B and 10–13) where each fruit that has been properly oriented is picked up, turned through 90°, and delivered to the pitting machine A without disturbing the alignment of the suture plane of the fruit with the direction of carriage advance. A reject mechanism H (FIG. 10) adjacent the transfer station G prevents removal of improperly oriented fruit from its carriage C as it passes through the transfer station G, thus permitting such rejected peaches to continue to be advanced by the conveyor D to the end thereof. Here the rejected fruit drops into a hopper J (FIG. 1), whence the rejected fruit can either be conducted to a suitable place of disposal or can be retrieved and replaced in the feeder hopper B so that it can again be sent through the machine 30.

The conveyor D

The operating components of the machine 30 are carried by a frame 32 (FIGS. 1, 2A, 2B and 3) comprising horizontally extending side plates 34a and 34b flanged at their upper and lower edges and rigidly maintained in spaced parallel relation by a plurality of U-shaped brackets 35 (FIGS. 2A and 2B) the upstanding, parallel legs of which are rigidly secured to the inner faces of the plates 34a and 34b (FIGS. 2A, 2B, and 3). The conveyor D comprises a pair of endless sprocket chains 38a and 38b trained at opposite ends about pairs of sprockets 40a, 40b (FIG. 2A) and 42a, 42b (FIG. 2B), respectively. The sprockets 40a and 40b at the inlet or receiving end of the machine 30 are carried by a shaft 44 journaled in bearings 46 one of which is carried by each of the side plates 34a and 34b. The sprockets 42a and 42b at the discharge end of the machine are rigidly secured to a shaft 48 journaled in bearings 50a and 50b carried by side plates 52a and 52b that constitutes a part of the frame of the pitting machine A. As shown in FIG. 2B the side plates 34a and 34b are rigidly secured to the side plates 52a and 52b, respectively, of the pitting machine A by pairs of rigidly interconnected angle brackets 53, the parts being so constructed and arranged that the discharge end of the conveyor D projects beyond the ends of the side plates 34a and 34b and into the pitting machine A so that the carriages C will pass under the rotary turret 54 of the pitting machine A as shown in FIG. 14.

During operation of the machine 30 the shaft 48 is constantly driven in a clockwise direction as viewed in FIGS. 1, 14 and 15 by a drive chain 55 (FIG. 15) trained around a sprocket gear 56 rigidly secured to the conveyor shaft 48. The chain 55 is likewise trained around a drive sprocket 57 fastened upon a countershaft 58 journaled in bearings 59a and 59b (FIG. 2B) mounted, respectively, on the side plate 52a and on an outboard bracket 60 rigidly secured to the side plate 52a. A gear 61 (FIGS. 1, 2B and 15) fastened to the counter-shaft 58 is in meshing engagement with a larger gear 62 secured to the main shaft 63 of the pitting machine A, with the result that the conveyor D of the machine 30 of the present invention is driven in synchronism with the main shaft 63 of the pitting machine A, which carries the operating turret 54 thereof and is constantly rotated counterclockwise as viewed in FIGS. 1, 14 and 15. As indicated diagrammatically in FIG. 15 the drive for both machines includes a motor 67 suitably mounted on the frame of the pitting machine A and connected by a chain drive 64 and a countershaft arrangement 65 with the above mentioned large gear 62 of the pitting machine A.

The U-shaped brackets 35 are spaced apart throughout the length of the side plates 34a, 34b and provides support for a pair of conveyor chain supporting rails 66a and 66b upon which the upper runs of the conveyor chains 38a and 38b, respectively, are slidably supported, as best shown in FIG. 3. The brackets 35 also provide support for a cam track 68 (FIGS. 2A, 2B, and 3) and an additional chain supporting rail 70 both of which are parallel to the conveyor chain supporting rails 66a and 66b and are spaced inward therefrom at a somewhat lower elevation. Throughout the length of the indent orienting zone E a pair of stationary cam track defining plates 72 are rigidly mounted by means of bolts 74. The two cam track plates 72 project inward from their respective supports in such relationship that they define between themselves a cam roller guiding slot 76 of wavy or sinuous form as shown in FIG. 2A. This cam slot 76 is widened at the end thereof nearer the inlet end of the machine 30 to provide an entrance flare 78 to facilitate entrance of camming rollers to the slot.

It is to be observed that the plates 72 are so formed that each crest of the sinuous roller guiding slot 76, instead of being of continuous curvature as in the case of an accurately drawn sine curve, includes a short straight section 79 the function of which will be explained in the description of the operation of the machine 30 of the invention.

Another pair of cam track defining plates 80 (FIG. 2A) that are similar to the plates 72, and which are similarly mounted, extend from the plates 72 throughout approximately half the length of the suture plane orienting zone F. The roller guiding slot 76 at the indent orienting station E opens directly into the corresponding slot 81 defined by the plates 80, so that rollers carried by the advancing carriages C will pass smoothly from the first roller guiding or camming slot 76 into the second camming slot 81. The latter slot 81 is likewise of sinuous form, but it differs from the slot 76 in that the crests of the slot 81 do not include any straight portions, but are arcuate and merge smoothly into the other regions of the sinuous slot 81, which therefore, more nearly resembles a true sine curve whose amplitude is the same as that of the slot 76, but whose crests are somewhat closer together.

The brackets 35 likewise provide support for a roller guiding channel 82 which is rigidly connected to the brackets 35 by bolts 83 and spacing tubes 84. The roller guiding channel 82 extends longitudinally of the machine 30 in parallel relation to the chain guides 66a and 66b at a slightly higher elevation than the cam track plates 72 and 80 and to one side of the slots 76 and 81 (see FIG. 3).

The fruit transporting carriages C

The carriages C upon which the fruit to be oriented are individually carried through the machine are disposed between the conveyor chains 38a and 38b to which they are secured at equally spaced intervals. Inasmuch as the several carriages C are all of identical construction the following description of one of the carriages will suffice for all. FIGS. 3, 4 and 5 illustrate one of the carriages C indicated in its entirety at 90 and comprising a frame 92 that is disposed between the two chains 38a and 38b and is secured thereto by means of a U-shaped yoke 94 (FIGS. 2, 3, 4 and 11) disposed in embracing relationship with the frame 92. The two legs 96 of the yoke 94 extend rearward from the yoke's connecting portion 98 adjacent the chains 38a and 38b to selected links thereof, the legs 96 being secured to these links by the pins 100.

As illustrated (FIGS. 4 and 5) the frame 92 of the carriage 90 includes a central vertical web 104 the plane of which is parallel to the direction of carriage movement. A transverse flange 106 at the forward vertical edge of the web 104 projects from both sides of the web; and the end of the flange 106 that is on the left hand side of the frame 92 viewed in the direction of carriage advance (i.e., the side of the frame 92 nearer the main frame side plate 34b) carries a rearwardly projecting bracket 108 (FIG. 4). The connecting part 98 of the associated yoke 94 is secured by cap screws 110 to the forward face of the transverse flange 106. Thus, the yoke 94 operates both to support the carriage and to pull it forward. Two wings 112 are integral with the lower end of the web 104. The forward ends of the wings 112 are integral with the lower edge of the transverse flange 106 and these wings slope not only downward and outward from the lower end of the web 104 but they also slope downward and rearward from the lower edge of the front flange 106. Rearwardly of the after vertical edge of the web 104 each of the wings 112 carries a horizontal bottom flange 114a, 114b, the flange 114a being on the right hand side of the carriage and the flange 114b on the left. Projecting rigidly downward from the under side of the bottom flange 114b is a pin 116 upon which a guide roller 118 is rotatably retained by a snap ring 120. The roller 118 travels along the guide channel 82 while the parts of the conveyor chains 38a and 38b to which the carriage 90 is connected are within the upper runs thereof. As shown in FIG. 3 the roller 118 fits the channel guide 82 so closely that lateral movement of the roller within the guide is minimized if not prevented entirely so that the cooperating roller 118 and its guide channel 82 impart lateral stability to the frame 92 as the carriage is advanced by the conveyor D.

An upstanding leg 122 is formed on the outer end of the flange 114a and carries at its upper end a boss 124 that is elongated transversely of the carriage to provide suitable bearing support for a shaft 126 that extends transversely of the carriage frame 92 with its axis intersecting the axis of the guide roller 118 as best seen in FIG. 4. On the outboard end of the shaft 126 a sprocket gear 128 is rigidly secured, and to the opposite end of the shaft 126, which projects a short distance beyond the longitudinal center line of the frame 92, a small pulley 130 is rigidly secured. At its lower side the sprocket gear 128 is enmeshed with the upper run of an endless drive chain 132 which is slidably supported by the hereinbefore mentioned chain supporting rail 70. This chain is driven so that the upper run thereof moves in the same direction as the chains 38a and 38b but at a considerably greater speed and, consequently, the chain 132 imparts rotation of the sprocket gear 128 and the pulley 130 during advance of the carriage 90 within the indent orienting zone E. The means for driving the chain 132 will be described more fully hereinbelow.

A boss 150 integral with the two horizontal flanges 114a and 114b and with the after ends of the wings 112 provides bearing support for a bracket 152. This bracket comprises a vertical post 154 having two lugs 156 and 158, respectively, projecting forward therefrom and journalled upon a vertical pivot pin 160 (FIG. 3) rigidly mounted with its axis substantially within the longitudinal central plane of the carriage 90. Thrust washers 162 are interposed between the top and bottom surfaces of the boss 150 and the respective lugs 156, 158 to carry the weight of the bracket 152 and to prevent axial play thereof. The lower lug 158 projects rearward beyond the lower end of the post 154 and carries at its rearmost end the downwardly projecting pin 164 upon which a roller 166 is rotatably retained by a snap ring 168. This roller 166 travels in the sinuous camming or guiding slots 76 and 81 and thus imparts oscillatory, or vibrating, pivotal movement to the bracket 152 about the vertical axis of the pivot pin 160 as the carriage advances through the indent orienting zone E and approximately the first half of the suture plane orienting zone F.

A horizontal arm 170 is provided at the upper end of the post 154. This arm 170 extends both forward and rearward from the upper end of the post 154 and carries at its forward end a horizontal shaft 172 rigid therewith and projecting laterally therefrom. A sleeve 174 that is rotatably mounted on the shaft 172 has gear teeth constituting a drive gear 176 formed on one end thereof and the other end the sleeve 174 is pressed fitted into a pulley 178. A belt 180 is trained around both pulleys 130 and 178 so that the drive gear 176 is positively driven as a consequence of the rotation imparted to the sprocket gear 128 through its meshing engagement with the chain 132. The belt 180 is sufficiently resilient to stretch to the slight additional length necessary to permit the bracket 152 to swing to the full range of its oscillating movement about the vertical axis of the pivot pin 160 and still remain adequately tight when the bracket returns to its center position.

The after end of the horizontal arm 170 curves upward to provide support for a laterally extending horizontal pivot pin 186 rigid therewith. A rocker arm 188 is pivotally mounted on the pin 186, and whereas the rocker arm 188 is electrically conductive, it is insulated from pin 186 and the arm 170 by a two-piece sleeve 190 (FIG. 6) of suitable dielectric material and having radial flanges 192 at its ends. One end of the rocker arm 188 projects forward from the pivot pin 186 and a shaft 196 rigid therewith extends laterally therefrom. The parts are so proportioned and arranged that the shaft 196 is directly above the shaft 172 so that an orienting disk or wheel 200 that is rotatably mounted upon the shaft 196 will engage the drive gear 176 when the forward end of the rocker arm 188 is in its lowest position, as illustrated in FIG. 4.

The orienting wheel 200 is provided throughout its peripheral edge with teeth 202 adapted to enmesh with those of the drive gear 176 when the forward end of the rocker arm 188 and the orienting wheel thereon are in their lowest position. However, the rocker arm 188 is constantly urged to rotate to raise its forward end and the orienting wheel carried thereby, by means of a coil spring 204 under tension between the after end of the rocker arm 188 and a pin 206 that is rigidly secured to a block 208 of insulating material adjustably secured by a screw 210 to the post 154 of the bracket 152.

A short conducting wire 212 connected at one end to the pin 206 and at its other end to a binding post 214 in the form of a machine screw that extends through the lower end of the post 154 so that its head 216 (FIG. 7) projects from the right hand side of the bracket 152. The screw 214 is of conductive material but is electrically insulated from the bracket 152 by a two-piece dielectric sleeve 217 having radial flanges 218 at its ends.

The above-mentioned spring 204 likewise is of electrically conductive material and consequently the orienting wheel 200 is constantly electrically connected to the head 216 of the binding post screw 214 which serves as a brush contact in an electrical circuit presently to be described. However, since both the binding post screw 214 and the rocker arm 188 are insulated from the bracket 152 by the insulating sleeves 217 and 190, respectively, they are electrically isolated from the remainder of the mechanism at all times except when the orienting wheel 200 is in its lowermost position where it makes engagement with the drive gear 176. It is, therefore, apparent that when the drive gear 176 and the orienting wheel are in meshing engagement, they serve the additional function of an electric switch that closes the above-mentioned electrical circuit.

Pivotal movement of the rocker arm 188 in the direction which causes upward movement of the orienting wheel 200 is restricted by an abutment pin 220 (FIGS. 4 and 5) which is threaded through a lug 222 projecting from the after end of the horizontal arm 170. A lock nut 224, when tightened, anchors the abutment pin in selected position of adjustment.

The distal end 230 (FIG. 3) of the orienting wheel supporting shaft 196 is extended far enough to project over a lifting arm 232 which is pivoted at its forward end upon a pivot pin 234 (FIG. 11) projecting laterally from a longitudinally extending flange 236 (FIGS. 4 and 11) integral with the upper edge of the transverse flange 106 at the leading side of the carriage frame 92. A finger 238 (FIGS. 12–14) rigid with the lifting arm 232 projects laterally therefrom in position for slidable engagement with a horizontal, longitudinally extending cam plate 240 (FIGS. 2A, 2B, 3 and 14) bolted to the main frame side plate 34a. The cam plate 240 is secured in operative position by cap screws 242 (FIGS. 3 and 14) extending through a flange 244 integral with and projecting downward from the outer lateral edge of the cam plate 240 and lying against the outer face of the main frame side plate 34a.

The cam plate 240 extends the full length of the suture plane orienting zone F and is disposed at such a height that when the finger 238 of the lifting arm 232 is lifted thereby the orienting wheel 200 is raised to an elevated position (FIG. 3) wherein it is out of engagement with the drive gear 176 and somewhat higher than the position to which the orienting wheel 200 can be raised by the spring 204.

An annular fruit supporting cup 250 of inverted frusto-conical form is carried by a bracket 252 (FIG. 5) which is adjustably mounted upon the trailing edge of the vertical web 104 of the carriage frame 92. The parts are so arranged that the cup 250 is centered above the orienting wheel 200 at such a height that when a peach is placed on the cup 250 in any position other than with its stem indent facing vertically downward, the peach will bear against both the cup 250 and the orienting wheel 200 with enough of the weight of the peach imposed upon the latter to overcome the resistance offered by the spring 204 and press the orienting wheel 200 downward into meshing engagement with the drive gear 176 as illustrated in FIGURE 4. While such intermeshing engagement is maintained, the orienting wheel 200 is constantly rotated, and because a substantial part of the weight of the peach is imposed upon the upper edge of the orienting wheel, rotation will likewise be imparted to the peach, particularly because of the presence of the teeth 202 on the periphery of the wheel which enhances the efficiency of the frictional interengagement between the wheel 200 and the peach.

When the peach has been thus rotated until it is disposed with its stem indent facing vertically downward, the spring 204 pivots the rocker arm 188 clockwise as viewed in FIGURE 4, raising the orienting wheel 200 into the stem indent of the peach, as shown in FIG. 5. This raises the orienting wheel 200 out of engagement with the drive gear 176 with the result that both the orienting wheel 200 and the peach cease to rotate.

Such orientation of a peach occurs while the carriage 90 is advancing through the indent orienting zone E (FIG. 2A), and it is immediately upon leaving the indent orienting zone E that the projecting finger 238 of the lifting arm 232 first reaches cam plate 240. The receiving end of the cam plate 240 slopes upward in the direction of carriage movement, and thus serves as a sloping ramp 254 whereby the advancing finger 238 is cammed upward until it reaches the upper surface of the cam plate 240, thus lifting the orienting wheel 200 to the above mentioned third position illustrated in FIGURE 3, wherein the orienting wheel is at a still higher elevation than when in the intermediate position illustrated in FIGURE 5. When in this uppermost position, the orienting wheel projects upward far enough to lift the peach, even though the orienting wheel engages the peach within the indent thereof. Therefore, throughout the time that the carriage is within the suture plane orienting zone F, the peach presses down against the orienting wheel 200 with almost its full weight. This is a factor which contributes to the efficiency of the apparatus in achieving suture plane alignment, as will be more fully explained in the description of the operation of the machine 30.

The discharge end of the cam plate 240 is formed with a forwardly and downwardly inclined ramp 256 (FIG. 14) so that as the finger 238 of the lifting arm 232 slides off the cam plate 240, the rocker arm 188 is lowered so gently that as the orienting wheel 200 drops, it lets the oriented peach come to rest gently upon the cup 250 without disturbing the attained orientation of the peach.

The carriage 90 carries a plate 260 (as best shown in FIGS. 3, 4 and 11) having a central aperture encircled by an annular bead that strengthens the plate 260 and functions as a ring to guide a peach as the same is delivered to the carriage 90 by the rotary feed hopper B and to assure reception of the peach upon the cup 250. The plate 260 is carried by a horizontal flange 264 at the upper end of a bracket 266 at which the outer ends of parallel links 268 are pivoted by pins 270 and 270a respectively. The inner ends of the links 268 are pivoted to the hereinbefore mentioned bracket 108 on the left hand side of the carriage frame 92. Thus, the plate 260 and the guide ring 262 formed therein are mounted for up and down translatory movement, enabling them to remain horizontal while the carriage 90 of which they are a part advances from the feed hopper B all the way to the opposite end of the conveyor D.

A cam follower roller 272 is rotatably mounted upon the lower pivot pin 270a and rides upon the upper edge of the hereinbefore mentioned cam track 68 (FIGS. 2A, 2B and 3). The cam track 68 extends substantially the full length of the conveyor D, and its upper, roller supporting edge is straight except for a short, low section 274 where the cam track 68 extends through the transfer station G (FIG 2B), a downwardly and forwardly sloping section 275 leading into the low section 274, and an upwardly and forwardly inclined section 278 leading from the same.

A coil spring 280 is under tension between the upper end of the bracket 266 and a pin 282 projecting from the left hand frame wing 112. This spring 280 holds the roller 272 down upon the cam track 68 so that while the carriage 90 advances through the two orienting zones E and F, the plate 260 and its guide ring 262 are maintained at a constant elevation somewhat higher than the cup 250 (as shown in FIG. 4 and in the first carriage position at the left hand side of FIG. 14). Thus, as the carriage 90 passes through the transfer station G the guide plate 260 is caused to assume a lower position, permitting the transfer mechanism ample clearance to function properly, as will be made clear in the disclosure to follow.

When the carriage 90 has completed its passage through the transfer station G, the roller 272 encounters the upwardly and forwardly sloping section 278 of the cam track 68, thus returning the guide plate 260 to its uppermost position (as illustrated in the 4th carriage position from the left in FIG. 14).

The hereinbefore mentioned longitudinally extending flange 236 at the forward portion of the carriage frame 92 also supports a fruit receiving blade 290 (FIG. 4) which lies substantially within the longitudinal central plane of the carriage 90 and consequently, directly in front of the fruit supporting cup 250. The blade 290 is sharpened along an upper horizontal edge 292 and a leading edge 294 which slopes downward and rearward from the upper edge 292. The blade 290 also includes an upstanding abutment having a substantially half-round leading edge 298 directly behind and slightly above the horizontal edge 292. The blade 290 is adapted to receive a peach removed from the immediately preceding carriage C at the transfer station G and to carry the peach to the pitting machine A in properly oriented aspect, as will be described in detail hereinbelow.

During the advance of the carriage 90 through the indent orienting zone E, the bracket 152 that carries the orienting wheel 200 is vibrated or oscillated about the axis of the vertical pivot pin 160 because of the sinuous nature of the cam slot 76 within which the camming roller 166 is confined, as already explained. During the advance of the carriage 90 through the suture plane orienting zone F, the bracket 152 is similarly oscillated but considerably more rapidly and, during the last phase of movement through the zone F, with gradually decreasing amplitude. This is accomplished by means of two channel shaped cam track sections 310 and 312, repectively (FIGS. 2B, 8 and 9). The cam track section 310 is arranged to receive the cam follower roller 166 of the carriage C as it leaves the stationary cam slot 81 after having advanced approximately half the length of the zone F, and after traveling the length of the cam track 310, the roller passes into the cam track section 312.

The cam track section 310 is vibrated or oscillated transversely of the machine 30 in translatory motion so that it remains at all times parallel to the longitudinal axis of the machine 30. It is supported on a plate or shelf 314 integral with and projecting toward the receiving end of the machine 30 from one of the side plate spacing brackets 35. Adjacent its distal end the shelf 314 carries two spaced apart, vertical pivot pins 316, upon each of which a cam track supporting link 318 is mounted for pivot movement in a horizontal plane. The cam track section 310 is pivotally supported upon the outer or distal ends of the two links 318 by means of pivot pins 320 extending rigidly downward from arms 322 which project laterally from opposite sides of the cam track section 310. The spacing between the two pivot pins 320 is the same as that between the pivot pins 316, and, consequently, the two supporting links 318 remain parallel to each other at all times and the cam track section 310 is supported thereby for translatory oscillatory motion in a transverse direction.

Such motion is imparted to the cam track section 310 by means of a cam follower roller 324 rotatably mounted upon a vertical pin 326 that is rigid with and extends downward from an extension 328 of one of the arms 322, as best shown in FIGURE 9. The roller 324 is confined within a groove 330 in the periphery of a cam disk 332, the plane of which is slightly oblique to the axis of the shaft 334 (FIGS. 2B, 8, 9 and 15) upon which the cam disk 332 is mounted, with the result that for each complete revolution of the shaft 334, the cam track section 310 is oscillated through a full cycle of its transverse movement. The shaft 334 is journalled in bearings 336 (FIGS. 2B and 9) affixed to the frame side plates 34a and 34b and is driven at constant speed by a sprocket chain 338 (FIGS. 2B, 9 and 15) trained around sprocket gears 340 and 342 secured respectively to the shaft 334 and to a countershaft 344. The countershaft 344 is the drive shaft of a fruit transfer mechanism 345 presently to be described and is journalled in bearings 346a and 346b (FIG. 2B). It is driven by a sprocket chain 347 (FIGS. 2B and 15) trained around sprocket wheels 348 and 349 affixed to the countershaft 344 and the countershaft 58, respectively.

The cam track section 312 is mounted for pivotal movement about a vertical axis by means of a pivot pin 350 (FIGS. 2B and 8) secured to an extension of the suporting shelf 314 that projects to the opposite side of the associated bracket 35 from the pivot pins 316 upon which the links 318 are mounted. The pivot pin 350 projects upward from said extension of the plate 314 and is received within a socket 352 that is provided on the undersurface of the cam track section 312 adjacent the end thereof nearer the discharge end of the machine 30. A bracket 354 projects downward from the opposite end of the cam track section 312 and carries an eye 356 within which is received a pin 358 that projects downward from the adjacent end of the cam track section 310, thus interconnecting the cam track sections 310 and 312 for pivotal movement with respect to each other. Consequently, as the cam track section 310 oscillates in translatory motion, it carries with it the free end of the cam track section 312 so that the adjacent ends of the two sections remain in alignment with each other but with the cam track section 312 oscillating in pivotal movement about the vertical axis of the pivot pin.

The cam track section 310 is formed at its inlet end with an entrance throat 360 (FIG. 2B) that flares toward the stationary cam groove defining plates 80. The larger end of the flare 360 is sufficiently wide to receive follower rollers 166 from the roller guide slot 81 regardless of the lateral position of the cam track section 310.

The drive for the chain 132 that rotates the sprocket gears 128 of the several carriages C within the indent zone E includes a sprocket chain 362 (FIGS. 2B and 15) trained around sprocket gears 364 and 366 that are secured respectively to the shaft 334 and a countershaft 368 (FIGS. 2A and 15) that is journalled in a bearing 370 (FIG. 2A) mounted on the frame side plate 34a adjacent the inlet end of the indent orienting zone F. The countershaft 368 has rigidly affixed thereto a sprocket gear 372 around which the chain 132 is trained. The chain 132 is also trained around an idler sprocket gear 374 that is freely rotatable upon the conveyor shaft 44 at the receiving end of the machine 30.

Fruit orienting operation

The result of the above explained constant rotation of the conveyor drive shaft 48 and the sprocket gear 42a and 42b thereon in a clockwise direction, as viewed in FIGURE 15, is that the conveyor D is constantly driven with the upper runs of the chains 38a and 38b moving from the receiving end toward the discharge end of the machine 30, carrying with them a succession of carriages C, each of which is of the same construction as the exemplary carriage 90 above described. Peaches to be oriented are dropped into or are otherwise supplied to the rotary feed hopper B, which feeds them individually to the carriages C as they pass successively under the hopper B. Accordingly, as the carriages advance through the orienting zones E and F, each carries a single peach.

The progress of a single carriage (here again identified as the carriage 90) through the orienting zones E and F will now be described as an example of the manner in which each carriage handles the peach thereon during its progress through these parts of the machine 30.

After the carriage 90 passes around the sprockets 40a and 40b and receives a single peach from the feed hopper B, the peach gravitates into and partly through the central aperture of the guide plate 260 of the carriage 90. At this time the guide plate 260 is retained in its uppermost position as the consequence of the engagement of its associated cam follower roller 272 upon the cam track 68. The plate 260 is thus held a distance above the level of the cup 250 only slightly less than half the diameter of the peach as shown in FIGURES 4 and 16. Consequently, the guide ring 262 of the plate 260 guides the peach so that it comes to rest upon the cup 250 but without any control over the direction in which the indent of the peach faces or the orientation of the suture plane of the peach. Unless the peach should happen to come to rest on the cup 250 with its indent already in a downwardly facing position, the peach will come to bear upon the orienting wheel 200, pressing the same downward against the urge of the spring 204 until the orienting wheel 200 engages and becomes enmeshed with the drive gear 176 as illustrated in FIGURES 4 and 16.

As the carriage 90 advances, the orienting wheel 200 is constantly rotated because of engagement of the sprocket gear 128 with the upper run of the drive chain 132 (FIG. 3), which is traveling in the same direction as and at a faster rate than the carriage 90.

Since the peach is supported in part by the orienting wheel 200 at such an elevation that it is not centered upon the cup 250, the peach leans to one side, resting at one point of its surface against the guide ring 262 as illustrated in FIGURES 4, 16, 17, and 18. Consequently, the peach initially will be rotated about an axis parallel to a line joining a point on the upper edge of the orienting wheel 200 and the point on the guide ring 262 against which the peach leans. However, as the carriage 90 continues to advance, the cam follower roller 166 thereof follows the wavy pattern of the guide slot 76, causing the bracket 152 to swing back and forth about the vertical axis of its supporting pin 160, (see FIGS. 17 and 18), thus causing the plane of rotation of the orienting wheel 200 to change frequently. Because of this arrangement the direction in which the rotative force is applied to the peach is frequently altered, causing the peach to be rolled around many different axes. This tends to prevent the same area of the surface of the peach from being presented more than once to the orienting wheel 200, thereby making the scanning operation more effective by increasing the probability of, and decreasing the time required for, attainment of registry for the indent of the peach with the orienting wheel 200.

The efficiency of the orienting wheel 200 in finding the stem indent of the peach is increased by the fact that the back and forth swinging movement of the bracket 152 is interrupted for a brief interval each time the bracket reaches either extreme of its swinging movement because of the presence of a straight section 79 at each crest of the wavy pattern of the guiding slot 76. This permits the rotating cam follower roller 166 to dwell for a brief interval when it reaches either extreme of its lateral swinging movement, without, however, interrupting the positive drive that causes the orienting wheel 200 to rotate about its own axis.

Therefore, with practically no exceptions the peach is turned to dispose its indent in a downwardly facing position before the carriage 90 completes its passage through the indent orienting zone E.

Upon attainment by the peach of a position wherein its stem indent faces vertically downward, the orienting wheel 200 is permitted to move upward into the stem indent as shown in FIGURE 19, in response to the urge of the spring 204. Thus the positive drive of the finder wheel 200 terminates immediately upon attainment of stem indent orientation because the finder wheel 200 moves out of meshing engagement with the drive gear 176. Therefore, the peach is permitted to remain in position upon the cup 250 with its stem indent facing downward and with the finder wheel 200 still projecting upward into the stem indent and still oscillating from side to side because of the engagement of its follower roller 166 within the sinuous cam slot 76.

Immediately upon attainment of stem indent orientation, the process of seeking the suture plane of the peach commences, because the peach during the remainder of its passage through the indent orienting zone E remains substantially stationary upon the cup 250 while the orienting wheel 200 continues to oscillate horizontally in a suture plane seeking operation, but without rotating about its own horizontal axis.

As the carriage 90 passes into the suture plane orienting zone F, its cam follower roller 166 enters the cam slot 81, so that the bracket 152 is then oscillated from side to side more rapidly than before because the camming slot 81 does not include straight sections at the crests of its wavy pattern. However, the bracket 152 continues to be oscillated through the same number of degrees, because the waves defined by the slot 81 are of the same amplitude as those of the slot 76 in the indent orienting zone E.

As the carriage 90 enters the suture plane orienting zone F, the laterally extending finger 238 of the lifting arm 232 (FIGS. 13 and 14) encounters the approach ramp 254 of the cam plate 240 (FIG. 2A), thus positively lifting the orienting wheel 200. Therefore, during the time that the carriage 90 advances within the suture plane orienting zone F, more of the weight of the peach is borne by the orienting wheel 200. This substantially increases the pressure with which the peach bears against the orienting wheel.

Due to the fact that the stem indent of a peach is characteristically longer than it is wide, the peach thus supported on the relatively thin orienting wheel 200 tends to settle onto the wheel, causing the latter to penetrate farther and farther into the stem indent as the plane of the wheel approaches alignment with the elongation of the stem indent. Moreover, when such alignment is attained, the orienting wheel 200 penetrates to the fullest possible extent into the indent (FIG. 20) and tends to become "latched" to the peach because it is necessary for the peach to be wedged upward, if the orienting wheel 200 turns so as to dislodge its plane from alignment with the longer axis of the indent. Therefore, each time the horizontal oscillating orienting wheel 200 returns from a position of maximum displacement from alignment with the longitudinal axis of the carriage 90, it carries the peach to a position closer to a condition of alignment of its suture plane with the longitudinal axis of the carriage.

The capability of the horizontally oscillating orienting wheel 200 to bring the suture plane of the peach into alignment with the longitudinal axis of the carriage is enhanced by the considerably more rapid oscillation experienced by the wheel when the cam follower roller 166 enters the transversely vibrated cam track 310. The rate of vibration of the cam track 310 is so high that its movement is tantamount to a shaking action, taking fullest advantage of the tendency of the peach to settle onto the orienting wheel 200. It is found that this gravitational settling of the peach in response to the rapid vibration of its supporting member is more effective in attaining final suture plane alignment with the plane of the orienting wheel 200 as compared with the action of the orienting wheel on the peach while the wheel is being oscillated at the less rapid rate resulting from the sinuousity of the stationary cam slot 81. Thus, fullest advantage is taken of the tendency for the peach to settle into a condition of suture plane alignment with the plane of the orienting wheel 200 as a consequence of the gradually decreasing amplitude of oscillation experienced by the orienting wheel as the cam follower roller 166 travels through the second straight cam track 312. Since the outlet end of the cam track 312 is pivoted, the oscillation of the orienting wheel 200 is reduced to zero amplitude as the carriage 90 completes its passage through the suture plane orienting zone F with the result that with a minimum of exceptions, every peach transported by a carriage 90 from the suture plane orienting zone F into the transfer station G is in a position with its stem indent facing vertically downward and with its suture plane in alignment with the longitudinal axis of the machine 30, as shown in FIG. 21.

*Modified fruit transporting carriage*

In most respects the modified form of fruit transporting carriage 400, shown in FIGS. 26–33, is the same as the carriage 90 already described. Therefore, only the structural features and operational details of the carriage 400 that distinguish it from the carriage 90 will be described herein.

The orienting wheel of the carriage 400 instead of being of one piece comprises two similar, axially spaced disks 402 rotatably mounted on horizontal shaft 404 (FIGS. 28–30) extending laterally from a rocker arm 406. The orienting disks 402 resemble the first described orienting wheel 200 in that each disk 402 is provided with teeth on its peripheral edge adapted to established meshing engagement with a drive gear 408 mounted and positively driven in the same manner as in the case of the first described carriage 90.

The rocker arm 406 is similar to the rocker arm 188 of the first described modification, differing therefrom only in that it is provided with a lift finger 410 projecting to the left therefrom.

Throughout the time that the carriage 400 is advancing within the suture plane orienting zone F′, the orienting disks 402 are raised to approximately the same position that the orienting wheel of the first described modification is raised in the suture plane orienting zone F′. This is accomplished by means of a cam plate 412 (FIG. 31) mounted on the left-hand side of the conveyor frame 414 and extending throughout the length of the suture plane orienting zone F′. It is adapted to be engaged by a finger 416 (FIG. 27) extending laterally from a lever 418 that is pivotally mounted at its forward end upon one of the screws 420 that mount on the forwardmost part of the carriage frame the fruit impaling and transferring plate 422 that corresponds to the plate 290 of the first described modification. The lever 418 extends rearward from the screw 420 to a position below the laterally projecting finger 410 of the rocker arm 406 with the result that when the lever 418 is raised by engagement of its finger 416 with the cam plate 412, the orienting wheel disks 402 are raised and operate to orient the peach with respect to its suture plane similarly to the manner in which the first described orienting wheel 200 operates in this regard.

A relatively thin suture plane finding blade 424 of inverted U-shaped configuration is disposed between the two orienting disks 402. The blade 424 is arranged with its two legs 426 extending downward from the part 428 that interconnects the legs 426, the legs 426 being disposed on opposite side of the shaft 404 on which the disks 402 are mounted and the connecting part 428 being disposed above the shaft 404. The blade 424 is mounted rigidly upon the outer end of an arm 430. The arm 430 and the rocker arm 406 that carries the disks 402 are pivotally mounted upon a pivot pin 432 which corresponds to the pivot pin 186 of the first described modification. A lifting finger 434 (FIG. 28) projects laterally to the right of the arm 430. Another lever 436 is mounted at its forward end upon the screw 420 at the opposite side of the blade 422. This lever is similar to the lever 418 and projects rearward from the screw 420 to a position under the lifting finger 434. A lifting finger 438 projects to the right from the lever 436 in position to engage a relatively short cam plate 440 that is mounted on the right-hand side of the conveyor frame 414 within the suture plane orienting zone F′ adjacent the outlet end thereof. Conjequently, after the carriage 400 has advanced through all but the last region of the suture plane orienting zone F′, the blade 424 is raised to a position where it projects slightly above the disks 402 as indicated by broken lines in FIG. 30.

The levers 418 and 436 are provided with adjustable stop pins 442 and 444 respectively adapted to engage the frame of the carriage 400 at points spaced rearward from the pivot screw 420 so as to prevent the levers 418 and 436 from dropping too low to become properly engaged upon their respective cam plates 412 and 440 as the carriage 400 passes the respective receiving ends thereof. The arm 430 on which the U-shaped plate 434 is carried is provided with a stop pin 446 projecting rigidly to the left thereof and over the upper edge of the rocker arm 406 to prevent the blade 424 from dropping to an inconveniently low position with relation to the disks 402.

The parts are so proportioned and arranged that during advance of the carriage 400 through the initial portion of the suture plane orienting zone F′, the disks 402 are raised through the cooperation of the lifting finger 416 with the cam plate 412. They are raised to substantially the same height as the orienting wheel 200 of the first described modification as shown in FIG. 32, and consequently, during this stage of the passage of the carriage through the zone F′, action of the orienting disks 402 against the peach is substantially the same as the corresponding action of the orienting wheel 200. However, when the carriage 400 reaches the last portion of the suture plane orienting zone F′, the relatively thin suture plane finding blade 424 is raised to a position projecting above the position of the disks 402, as shown in FIG. 33. Being much thinner than the orienting wheel 200, the blade 424 is considerably more sensitive to the elongated shape of the stem indent of the peach and consequently locates the elongation of the stem indent more positively and aligns the suture plane of the peach with the direction of travel of the carriage more accurately.

*The fruit transfer mechanism 345*

From the preceding description of the fruit transporting orienting carriages 90 and 400, it will be apparent that regardless of which of the two types of carriages is employed, a succession of carriages pass rapidly from the suture plane orienting zone F of the machine 30 into the transfer station G thereof, each carriage bearing a single peach.

As shown in FIG. 2B, the cam plate 240 that holds the orienting wheel 200 in its uppermost position terminates just short of the transfer station G. This is true, likewise, of the cam plates 412 and 440 whereby the orienting disks 402 and the suture plane finding blade 424, respectively, are held in their uppermost positions, as shown in FIG. 31. Therefore, each peach is supported on the cup 250 of the advancing carriage 90 or 400, as the case might be, with the peach disposed with its stem indent facing downward and with its suture plane parallel to the direction of carriage movement, as shown in FIG. 22.

For the sake of convenience in the description to follow, the progress of a single carriage C through the transfer station G will be described with the understanding that it is merely exemplary of the operation of a rapid succession of carriages, each of which may correspond to either the carriage 90 or to the carriage 400.

Referring now to FIGS. 10–13, the transfer mechanism 345 includes two bell cranks 460, each mounted for pivotal movement about a vertical pivot pin 462 rigidly supported by a bracket 464, one of which is mounted on each of the frame side plates 34a and 34b. One arm 466 of each bell crank projects forward from its associated pivot pin 462 approximately parallel to the direction of carriage movement. The other arm 468 of each bell crank 460 projects laterally outward beyond the plane of its associated frame side plate 34a or 34b.

Two transversely extending shafts 470 are rotatably mounted in co-axial relation by means of brackets 472, one of which is rigidly secured to each of the frame side plates 34a or 34b. On each of the shafts 470 adjacent the inboard end thereof, a split collar 474 (FIGS. 11–13) is confined between two radial flanges 476, the two halves of each collar 474 being clamped together by screws 478 and each collar being fitted to its shaft 470 to permit free rotation of the shaft while the collar remains stationary.

The forward ends of the bell crank arms 466 are bifurcated in vertical planes to embrace pins 480 projecting vertically from the respective associated collars 474 so that the shafts 470 can be shifted axially in response to pivotal movement of the bell cranks 460 about their pivot pins 462.

The outboard ends of the bell crank arms 468 carry pivot pins 488. Each pin 488 pivotally connects the associated bell crank arm 468 to the after end of a pitman 490. The pitmans 490 are pivotally connected to crank arms 492a (FIG. 11), 492b (FIG. 10), respectively, by a crank pin 494, the two crank arms being parallel to each other and projecting upward from a shaft 496 common to both but on opposite sides of the conveyor frame 32. Both crank arms 492a and 492b are rigidly secured to the shaft 496.

Thus it may be seen that both transverse shafts 470 can be shifted inward, i.e., toward each other, by turning the shaft 496 a few degrees in a counterclockwise direction as viewed in FIG. 10, or outward away from each other by an opposite rotary movement of the shaft 496.

The crank arm 492b is provided with a lever 500 integral therewith and projecting downward therefrom beyond the shaft 496. A projection 502 of the lever 500 carries a cam follower roller 504 rotatably mounted thereon and in rolling engagement with the periphery of a cam plate 506. The roller 504 is held against the cam plate 506 by means of a coil spring 508 under tension between the associated crank pin 494 and threaded rod 510 extending through a flange 512 projecting laterally from the pitter frame side plate 52b. Nuts 514 screwed onto the rod 510 and bearing against opposite faces of the flange 512 secure the rod 510 in position with the spring 508 suitably tensioned.

A stop pin 515 is threaded through the lower end of the lever 500 and is releasably secured in selected position of adjustment by a lock nut 516. The pin 515 is provided with a cushion 517 adapted to engage an abutment stop 518 rigid with the frame side plate 34b and thus limit the angular distance that the spring 508 can turn the lever 500 and the crank arm 492b and thus limit the distance that the spring 508 can cause the two shafts 470 to move toward each other.

A cam plate 506 is carried by the shaft 344 which extends transversely of the conveyor frame 32 and is of sufficient length to project beyond both sides thereof where it is rotatably supported by bearings 346a and 346b rigid with the frame side plates 34a and 34b. The end of the shaft 344 projecting beyond the frame side plate 34b has a hub 524 rigidly secured thereto. The cam plate 506 is rigidly but adjustably secured to the outer face of the hub 524 by a plurality of cap screws 526, each of which extends through an arcuate slot 528 in the cam plate 506 so that the cam plate can be adjusted about the axis of the shaft 344 to attain the desired precise timing of the transfer mechanism 345.

Another cam plate 532 (FIGS. 10 and 11) is secured to the opposite face of the hub 524 by the same cap screws 526. The cam plate 532 is likewise provided with arcuate slots (not shown) through which the cap screws 526 extend so that the cam plate 532 can be similarly rotationally adjusted. A cam follower roller 534 is carried by a lever 536 that is rigidly secured to a sleeve 537 rotatably mounted upon the shaft 496. The lever 536 projects downward from the sleeve 537. Two sector shaped plates 538, both rigid with the sleeve 537, project upward therefrom. The two sector plates 538 are disposed at opposite sides of the conveyor frame 32, and the lever 536 may be integral with one of the plates 538.

Each sector plate 538 carries a sector gear. A coil spring 540 under tension between one of the sector plates 538 and a threaded rod 542 holds the cam follower roller 534 against the cam plate 532. The rod 542 is adjustably connected to the flange 512 and similarly anchored in adjusted position relatively by nuts 543.

A sector gear 544 is adjustably secured to each sector plate 538 by cap screws 546 extending through arcuate slots 548 in the gear 544 and each gear 544 is enmeshed with a spur gear 550 rigidly secured as by a key 552 to the associated transverse shaft 470.

Thus it may be seen that the function of the cam plate 506 is to shift the shafts 470 simultaneously in opposite directions and the function of the cam plate 532 is to impart rotary motion simultaneously to the shafts 470.

A short lever 560 is secured rigidly at one end thereof to the inboard end of each of the opposed shafts 470, the two levers 560 projecting laterally from their shafts 470 in planar alignment with each other. Two opposed inwardly facing fruit gripping jaws 562 are carried by the short levers 560, each being secured to one of the levers 560 by means of a stud 564 to which the jaw is secured by a flexible connection 566 that permits the associated jaw to accommodate itself to a fruit gripped between the two jaws 562.

*Operation of the transfer mechanism 345*

The cam plate 506 is so adjusted on its shaft 344, and rotation of the shaft 344 is so synchronized with the operation of the conveyor D that the two opposed shafts 470 are propelled inward toward each other just in time for the fruit gripping jaws 562 to arrive in fruit grasping relationship with each other each time one of the carriages C arrives with the vertical center line of its orienting wheel in alignment with the fruit gripping jaws 562. When this occurs, the two levers 560 are disposed horizontally and project from their shafts 470 toward the receiving end of the machine 30, i.e., in the direction opposite the direction of carriage movement, as shown in FIGS. 12 and 22. Consequently, whenever a carriage arrives with a peach thereon in alignment with the jaws 562, the jaws arrive in a position to grasp the fruit for the purpose of removing the same from the carriage. Immediately thereafter, the cam plate 532 arrives in position to impart rotary movement to the shafts 470, causing the shafts to simultaneously turn 90° in a counterclockwise direction, as viewed in FIGURE 10. This causes the jaws 562 to not only lift the fruit off the cup 250 but also to rotate it 90° from the position in which it is illustrated in FIGS. 12 and 22 to that of FIGS. 13 and 23.

Each oriented peach being advanced into the transfer station G is disposed with its stem blossom axis vertical and substantially directly above the orienting wheel of the carriage, regardless of the overall diameter of the peach. Therefore, the center of the peach is at a certain distance, within quite close limits, from the axis of the shafts 470 of the fruits transfer mechanism 345 measured in a horizontal direction. When the fruit has been gripped by the two jaws 562, lifted thereby from the cup 260, and turned 90°, the center of the peach will still be the same distance from the axis of the shafts 470 as it was when the peach was first engaged by the jaws but now measured in a vertical direction. Therefore, after the shafts 470 have been turned 90°, the center of the peach is quite accurately at a certain predetermined distance above the axis of the shafts 470.

Consequently, by proper adjustment of the fruit impaling and transferring blade 290 or 422, as the case might be, the peach, after having been lifted from the cup 250 of a carriage C and turned 90°, will be precisely at the right elevation to be engaged by the impaling blade 290 or 422 of the next successive carriage C, regardless of the size of the peach, within reasonable limits. The peach thus becomes impaled upon the transfer blade of the following carriage with the sharpened edges 294 and 292 incising into the flesh of the peach and with the half round edge 298 of the abutment of the blade seating within the stem indent, as shown in FIG. 24.

The transfer mechanism 345 experiences a full cycle of its operation each time a carriage C progresses through the transfer station G. In doing so, the transfer mechanism 345 takes a properly oriented peach from the cup 250 of one carriage, interrupts the forward progress of the peach without interrupting forward progress of the carriage and thus, after the peach has been raised and turned so that its stem indent faces horizontally toward the receiving end of the machine 30, holds the peach in position to be impaled by the blade 290 or 422 of the following carriage. Being thus transferred to the following impaling blade 290, 422, the peach immediately resumes its forward progress, oriented with its suture plane parallel to the direction of the conveyor advance and at the optimum elevation for transfer to an opposed pair of fruit receiving cups 570 constituting a part of the rotary turret 54 of the peach pitter A as indicated in FIGURE 25. Thus the peach is transferred to the rotary turret 54 which presents the peach to a splitting saw 572 (FIG. 14) in the manner well-known in commercial use of peach pitters of common design so that the peach is bisected through both the flesh and the pit of the peach substantially within the suture plane of the peach.

The reject mechanism H

As shown in FIGURE 10, a solenoid 580 is mounted on the frame side plate 34b adjacent the abutment stop 518. The armature 582 of the solenoid 580 is operatively connected by means of a link 584 to a detent 586 pivotally mounted upon the side plate 34b by a pin 588. Normally, i.e., when the solenoid 580 is de-energized, the detent 586 is in a lower position wherein it does not interfere with movement of the lever 500 of the transfer mechanism 345. However, when the solenoid 580 is energized, the armature 582 thereof is drawn upward, correspondingly pivoting the detent 586 upward into the path of a block 590 rigidly secured to the lever 500 and thus preventing the spring 508 from turning the shaft 496 and thereby moving the two opposed shafts 470 inward when the lobe 592 of the cam 506 moves away from the cam follower roller 504. In other words, when the solenoid 580 is energized, it disables the transfer mechanism 345 by preventing the fruit receiving jaws 562 from moving inward to grasp the peach then being moved into the transfer station G.

Referring to FIG. 2B, a wiper contact 594 of electrically conductive material is movably mounted by means of a bracket 596 on the one of the brackets 35 of the conveyor frame 32 which is adjacent the transfer station G. The contact 594 is in position to be slidably engaged by the screw head 216 described hereinabove as functioning as a brush contact. The wiper contact 594 is in such position considered longitudinally of the machine 30 that the screw head 216 of each carriage C slidably engages and makes electrical contact with the brush contact 594 immediately before the associated carriage C reaches the position in which lobe 592 of the cam 506 departs from the cam follower roller 504.

The wiper contact 594 is mounted upon a block 598 of dielectric material and a coil spring 600 under compression between the insulating block 598 and a flange 602 of the bracket 596 yieldably holds the contact 594 in position to be engaged successively by the screw heads 216 of successive carriages C as they pass through the transfer station G.

One terminal of the solenoid 580 is grounded to the frame 32 of the machine 30 and the other terminal is connected by a conductor not shown with the wiper contact 594.

As hereinabove stated in the description of the carriage 90, the screaw head or brush contact 216 of each carriage is connected by the wire 212, the spring 204, and the rocker arm 188 with the orienting wheel 200, all of which elements are electrically insulated from the remainder of the carriage. The same is true of the modified form of carriage 400. The drive gear 176 of each carriage C, however, is grounded to the remainder of the carriage with the result that if the finder wheel 200 or 402, as the case might be, is in engagement with the drive gear 176 of any carriage C at the time that the brush contact screw head 216 of that carriage is engaged with the wiper contact 594, the solenoid 580 will be energized, the detent 586 will be moved into disabling position, and the transfer mechanism 345 will thereby be disabled.

Thus it may be seen that when a peach moved into the transfer station G by any one of the carriages C is otherwise than in properly oriented position, the orienting wheel 200, 402, will be pressed downward because of its failure to penetrate into the stem indent of the peach as the particular carriage approaches and enters the transfer station G. If these conditions obtain as the particular carriage passes through the transfer station G, i.e., during the time that the screw head brush contact 216 engages the wiper contact 594, the transfer mechanism 345 will be disabled and the improperly oriented peach will remain in position upon the cup 250 of the carriage instead of being removed therefrom by the transfer mechanism 345. To hold the finder supporting bracket 132 of the carriage C steady as the carriage advances through and beyond the transfer station G and thereby to aid in preventing accidental dislodgement of a rejected, improperly oriented peach from the cup 250 as the carriage C approaches the end of the conveyor D, a guide channel 610 (FIG. 2B) is rigidly mounted upon two of the frame brackets 35 in position for the cam follower roller 166 to enter the channel 610 immediately upon departing from the pivotally oscillating cam track section 312.

As hereinbefore stated, the low section 274 of the cam track 68 extends through the transfer station G. Therefore, during progress of each carriage C through the transfer station G, the follower roller 272 (FIGS. 3 and 4) is in a lower position than when approaching the station G, as is likewise the guide plate 260 since it is supported by the roller 272. Thus, while each carriage is within the transfer station G, the plate 260 is lowered to a position where it avoids interference with the transfer mechanism 345. However, upon completion of movement of a carriage past the transfer mechanism 345, the roller 272 of the carriage reaches and is raised by the upwardly sloping portion 278 of the cam track 68, thus returning the plate 260 to its upper position, where it offers additional aid in preventing accidental dislodgement of an improperly oriented, rejected peach that remains on the cup 250 of the carriage.

Therefore, the improperly oriented peach will continue on to the end of the conveyor D and as the particular carriage C passes around the sprockets 42a and 42b, the peach thereon will be dumped off the carriage and into the reject hopper J.

While a particular embodiment of the present invention has been shown and described it will be understood that the apparatus is capable of modification and variation without departing from the principles of the invention and that the scope of the invention should be limited only by the scope and proper interpretation of the claims appended hereto.

The invention having thus been described, what is believed to be new and is desired to be protected by Letters Patent is:

1. Apparatus for orienting fruit, comprising a movably mounted indent finder arranged for engagement with a fruit having a surface indent, means imparting a predetermined movement to the finder for effecting relative motion between the finder and the fruit to cause the finder to scan the surface of the fruit, and means rendered operative upon alignment of the indent and the finder for disconnecting the finder from said motion imparting means.

2. Apparatus for orienting fruit, comprising a movably mounted indent finder arranged for driving engagement with the surface of a fruit having a surface indent, means for imparting motion to the finder while the same is in engagement with the fruit so that relative motion occurs between the finder and the fruit to cause the finder to scan the surface of the fruit, and means responsive to registration of the indent and the finder for effecting termination of said motion of the finder.

3. Apparatus for orienting fruit having an indent in the surface thereof, comprising a movably mounted indent finder arranged to rotate a fruit by engagement with the surface of the fruit and for entry into the indent thereof upon attainment of registration of the indent with the finder, drive means for moving the finder while the finder engages the fruit to rotate the fruit and thereby cause the finder to scan the surface of the fruit, and means for entering the finder into the indent to disengage the finder from the drive means when the fruit is in position with its indent facing toward the finder.

4. Apparatus for orienting fruit, comprising a movably mounted indent finder arranged for engagement with the surface of a fruit having a surface indent and for entry into the indent when the indent is aligned with the finder, drive means operably connected to the finder for effecting relative motion between the finder and the fruit to cause the finder to scan the surface of the fruit, means for entering the finder into the indent upon attainment of registration of the indent with the finder, and means operable in response to entry of the finder into the indent for disconnecting the drive means from the finder.

5. Apparatus for orienting fruit having a surface indent, comprising a movably mounted indent finder arranged to support a fruit to be oriented by engagement with the surface thereof and for entry into the indent when the indent registers with the finder, drive means connected to the indent finder for moving the same and thereby effecting relative motion between the finder and the fruit whereby the finder is caused to scan the surface of the fruit to find the indent, means controlled by entry of the finder into the indent for disconnecting the drive means from the indent finder to effect termination of said relative motion, and means for entering the finder into the indent when the fruit attains a position with its indent in register with the finder.

6. Apparatus for orienting fruit, comprising a rotatably mounted indent finder wheel arranged for engagement with the surface of a fruit having a surface indent and for entry into the indent, means for rotating the finder wheel to turn a fruit engaged thereby and cause the finder wheel to scan the surface of the fruit, and means operative when the indent registers with the finder wheel for entering the finder wheel into the indent and for disabling said rotating means.

7. Apparatus for orienting indented fruit, comprising a rotatably mounted indent finder wheel arranged to support a fruit by engagement with the surface thereof and arranged for entry into the indent, means for continuously rotating the finder wheel to turn the fruit until the indent is aligned with the finder wheel, means operative when the indent is aligned with the finder wheel to enter the finder wheel into the indent, and means operative in response to entry of the finder wheel into the indent for terminating rotation of the finder wheel.

8. Apparatus for orienting indented fruit, comprising a rotatably mounted indent finder wheel arranged to support a fruit by engagement with the surface thereof and arranged for entry into the indent, means for continuously rotating the finder wheel to turn the fruit until the indent is aligned with the finder wheel, and means operative when the indent is aligned with the finder wheel to enter the finder wheel into the indent and to stop rotation of he finder wheel.

9. Apparaus for orienting fruit having a surface indent, comprising a rotatably mounted indent finder wheel arranged to support and rotate a fruit to be oriented by engagement with the surface thereof, means for rotating the finder wheel to impart rotary movement to the fruit whereby the finder wheel is caused to scan the surface of the fruit to find the indent, and means operative when the indent is aligned with the finder wheel for disabling said finder wheel rotating means.

10. Apparatus for orienting fruit having a surface indent, comprising a rotatably mounted indent finder wheel arranged to support a fruit to be oriented by engagement with the surface thereof and for entry into the indent when the indent registers with the finder wheel, gear teeth on the finder wheel, a drive gear rotatably mounted adjacent said finder wheel and engageable with said gear teeth at a region thereof diametrically opposite a fruit engaged by the finder wheel, means for driving said gear to rotate the finder wheel and thereby cause the fruit to progressively present different regions of its surface to the finder, and means operative when the indent is registered with the finder wheel for moving the finder wheel into the indent and out of engagement with the drive gear.

11. Apparatus for orienting fruit as set forth in claim 10, wherein said gear teeth are on the periphery of the finder wheel in position to engage the fruit and thereby increase the efficiency of the driving engagement of the finder wheel with the fruit.

12. Apparatus for orienting fruit having an elongate surface indent, comprising a movably mounted elongate indent finder arranged to support a fruit to be oriented by engagement with the surface thereof and for entry into the indent when the indent registers with the finder, means for imparting movement to the indent finder to effect relative motion between the finder and the fruit whereby the finder scans the surface of the fruit to find the indent, means operative upon attainment of registration of the finder and the indent for entering the finder into the indent, means operative in response to entry of the finder into the indent for effecting termination of said movement of the indent finder, and means for vibrating the finder while the same supports the fruit by engagement within the indent thereof to align the indent elongation with the elongation of the finder.

13. Apparatus for orienting fruit, comprising an elongate indent finder arranged to support a fruit having a surface indent, means mounting the finder for upward and downward movement along a predetermined axis and for rotary movement about said axis, means for effecting relative motion between the finder and the fruit to cause the finder to scan the surface of the fruit, means for entering the finder into the indent when the indent registers with the finder, said motion effecting means becoming ineffective upon entry of the finder into the indent, and means for oscillating the finder about said axis while the finder is entered into the fruit in supporting relation therewith to align the indent elongation with the finder elongation.

14. Apparatus for orienting fruit having an indent in the surface thereof, comprising a movably mounted indent finder arranged to support a fruit by engagement with the surface of a fruit and for entry into the indent when the indent registers with the finder, and means for effecting relative motion between the finder and the fruit only until the indent is aligned with the finder, a transfer mechanism operable to remove the fruit from the finder, and means connected to the finder for operation thereby for controlling operation of said transfer mechanism, said controlling means including an electric circuit containing said finder and said motion effecting means.

15. Apparatus for orienting fruit having an indent in the surface thereof, comprising an indent finder arranged to engage a fruit and for movement from a first position to a second position projecting into the indent when the indent of the fruit is aligned with the finder, means for effecting relative motion between the finder and the fruit, means for moving the finder from said first position to said second position when the indent and the finder are aligned, a transfer mechanism for removing the fruit from the finder, and means for disabling said transfer mechanism, said disabling means including an electric circuit of which said finder and said motion effecting means are constituent parts electrically interconnected only when the finder is in said first position.

16. Apparatus for orienting fruit, comprising a rotatably mounted finder wheel arranged to support a fruit to be oriented and arranged for movement from a first position to a second position, said finder wheel having gear teeth for rotating the finder wheel, a driving gear rotatably mounted in position for releasable meshing engagement with said gear teeth when the finder wheel occupies said first position to rotate the finder wheel and to establish electrical conduction therebetween, means for moving the finder wheel from said first position to said second position when the fruit is oriented to disengage said gear teeth from the driving gear, a transfer mechanism for removing oriented fruit from said finder wheel, said driving gear and said gear teeth being electrically insulated from each other when they are disengaged, and electrically operated means for disabling the transfer mechanism and electrically connected in series with said gear teeth and said driving gear whereby the disabling means is actuated only when the finder wheel is in said first position.

17. Fruit handling apparatus comprising a plurality of movably mounted carriages, means for advancing the carriages along a predetermined path, a fruit support and a fruit receiving means on each carriage, and a transfer mechanism mounted adjacent said predetermined path and including fruit engaging means movable transversely with relation to said path and means connecting the fruit engaging means to the carriage advancing means for operation in synchronism therewith to engage a fruit on the support on one of the carriages and to support the fruit in position for reception by the receiving means of a succeeding one of said carriages.

18. Fruit handling apparatus comprising a plurality of movably mounted carriages, means for advancing the carriages along a predetermined path, a fruit support and a fruit receiving means mounted at different elevations on each carriage, and a transfer mechanism mounted adjacent said predetermined path and including fruit engaging means movable transversely with relation to said path and means connecting the fruit engaging means to the carriage advancing means for operation in synchronism therewith to engage a fruit on the support on one of the carriages and to shift the fruit into a position in advance of the receiving means of a succeeding one of said carriages.

19. Fruit handling apparatus comprising a plurality of movably mounted carriages, means for advancing the carriages sequentially along a predetermined path, a fruit support on each carriage, fruit receiving means on each carriage, and a transfer mechanism mounted adjacent said predetermined path and including fruit engaging means movable transversely with relation to said path and means connecting the fruit engaging means to the carriage advancing means for operation synchronously therewith to engage a fruit on the support on one of the carriages and to support the fruit in position for reception by the receiving means of another of said carriages.

20. Fruit handling apparatus comprising a plurality of movably mounted carriages, means for advancing the carriages sequentially along a predetermined path, a fruit support on each carriage, fruit receiving means on each carriage in a different relation to said path than said fruit support, and a transfer mechanism mounted adjacent said predetermined path and including fruit engaging means movable transversely with relation to said path and means connecting the fruit engaging means to the carriage advancing means for operation synchronously therewith to engage a fruit on the support on one of the carriages and to shift the fruit to a position in the path of the receiving means of the next succeeding carriage.

21. Fruit handling apparatus comprising a plurality of movably mounted carriages, means for advancing the carriages sequentially along a predetermined path, a fruit support and a fruit receiving means on each carriage, and a transfer mechanism mounted adjacent said predetermined path and including fruit engaging means movable transversely with relation to said path and rotatable about an axis lying in a plane perpendicular to said path, means connecting the fruit engaging means to the carriage advancing means for operation synchronously therewith to engage a fruit on the support on one of the carriages and to support the fruit in position for reception by the receiving means of another of said carriages, and means connected to said fruit engaging means for operation synchronously therewith to rotate the fruit engaging means while a fruit is supported thereon.

22. Fruit handling apparatus comprising a plurality of movably mounted carriages, means for advancing the carriages sequentially along a predetermined path, means on each carriage adapted to support a fruit oriented to a predetermined aspect, fruit receiving means on each carriage, and a transfer mechanism mounted adjacent said predetermined path and including fruit engaging means rotatable about an axis extending transversely of said path and movable in the direction of said axis, and means connecting the fruit engaging means to the carriage advancing means for operation synchronously therewith to engage a fruit on the support on one of the carriages and to support the fruit in position for reception by the receiving means of the next succeeding carriage, and means connected to said fruit engaging means for operation synchronously therewith to rotate the fruit engaging means and thereby place the fruit supported thereby in a different aspect before reception of the fruit by said receiving means of said succeeding carriage.

23. Fruit handling apparatus comprising a plurality of movably mounted carriages, means for advancing the carriages sequentially along a horizontal path, a fruit support on each carriage, means for orienting a fruit on the support to a position with its suture plane substantially vertical and parallel to said path and with its stem indent facing downward, fruit receiving means on each carriage, and a transfer mechanism mounted adjacent said predetermined path and including fruit engaging means movable transversely with relation to said path and rotatable about an axis lying in a plane perpendicular to said path, means connecting the fruit engaging means to the carriage advancing means for operation synchronously therewith to engage an oriented fruit on the support on one of the carriages and to support the fruit in position for reception by the receiving means of another of said carriages, and means connected to said fruit engaging means for operation to turn the fruit supported thereby in the suture plane of the fruit to a position with its stem indent facing horizontally.

24. Fruit handling apparatus comprising a sequence of movably mounted fruit supports adapted to receive fruit individually in random positions, a movably mounted fruit receiver between each two adjacent fruit supports, means for progressing said fruit supports and said fruit receivers along a predetermined horizontal path, said fruit supports including means for orienting the fruit thereon to a position with its stem indent facing downward, and a transfer mechanism including fruit engaging means mounted for reciprocative movement transversely of said horizontal path and for rotary movement about an axis parallel to the direction of said reciprocative movement, means connecting said fruit engaging means to said progressing means for operation in synchronism therewith to engage an oriented fruit on one of said fruit supports, and means connected to said fruit engaging means for operation while a fruit is engaged thereby to shift the same into a position in advance of the next succeeding one of said fruit receivers and to rotate the engaged fruit to dispose the same in a position with its stem indent facing horizontally.

25. Fruit handling apparatus comprising a sequence of movably mounted fruit supports adapted to receive fruit individually in random positions, a movably mounted fruit receiver between each two adjacent fruit supports, means for progressing said fruit supports and said fruit receivers along a predetermined horizontal path, said fruit supports including means for orienting the fruit thereon to a position with its stem indent facing downward, means for moving the orienting means into the recess when the recess faces downward, a transfer mechanism including fruit engaging means mounted for reciprocative movement transversely of said horizontal path and for rotary movement about an axis parallel to the direction of said reciprocative movement, means connecting said fruit engaging means to said progressing means for operation in synchronism therewith to engage an oriented fruit on one of said fruit supports, and means connected to said fruit engaging means for operation while a fruit is engaged thereby to shift the same into a position in advance of the next succeeding one of said fruit receivers and to rotate the engaged fruit to dispose the same in a position with its stem indent facing horizontally, and a reject mechanism mounted adjacent said transfer mechanism and including means movable into a position to disable the transfer mechanism and means actuated by the orienting means of any one of said fruit supports provided the orienting means thereof has failed to enter the stem indent of the fruit on said one fruit support when said one fruit support passes said transfer mechanism.

26. Apparatus for orienting fruit having a stem indent of greater length than width, comprising a rotatably mounted indent finder wheel arranged in driving engagement with the surface thereof, means for turning the finder wheel to rotate the fruit and thereby cause the finder wheel to scan the surface of the fruit, means operative when the indent registers with the finder wheel for stopping rotation of the fruit, a suture plane finder blade mounted for movement into the indent, means operative when rotation of the fruit has stopped for projecting the finder blade into the indent, and means for oscillating the finder blade while the same is projected into the indent to align the elongation of the indent with finder blade.

27. Apparatus for orienting fruit having a stem indent of greater length than width, comprising a rotatably mounted indent finder wheel arranged to engage the surface of the fruit, means for turning the finder wheel to rotate the fruit and thereby to present different regions of the area of the fruit to the finder wheel, means operative when the indent registers with the finder wheel for stopping rotation of the fruit, a suture plane finder blade mounted adjacent said finder wheel for movement into the indent, means operative when the indent registers with the finder blade for projecting the finder blade into the indent, and means for oscillating the finder blade while the finder blade projects into the indent to align the elongation of the indent with finder blade.

28. Apparatus for orienting fruit having a stem indent of greater length than width, comprising an indent finder wheel mounted for rotation and for upward movement, said finder wheel being arranged to support a fruit by engagement with the bottom surface thereof, means for turning the finder wheel to rotate the fruit to present different parts of the surface of the fruit to the finder wheel and thereby cause the finder wheel to scan the surface of the fruit, means for projecting the finder wheel into the indent and for stopping rotation of the finder wheel to terminate rotation of the fruit when the indent faces downward, a suture plane finder blade mounted for upward movement adjacent the finder wheel, means operative when the finder wheel projects into the indent for projecting the finder blade into the indent past the finder wheel, and means for oscillating the finder blade while the finder blade is projected into the indent to align the indent elongation with finder blade.

29. Apparatus for orienting fruit comprising means for movably supporting a fruit, means arranged for driving engagement with a fruit supported by said supporting means for moving the fruit and for sensing orientation of the fruit, driving means operably connected to said fruit moving means to actuate the same, and means responsive to attainment of a predetermined orientation of said fruit as determined by said sensing means for disconnecting said actuating means from said fruit moving means.

30. Apparatus for orienting fruit comprising fruit rotating means arranged for driving engagement with a fruit, means mounting said rotating means for movement in a predetermined direction upon attainment of a predetermined orientation by the fruit, driving means releasably connected to said fruit rotating means to actuate the same, and means responsive to attainment of said predetermined orientation by the fruit for moving said rotating means in said predetermined direction to disconnect said rotating means from said driving means.

References Cited in the file of this patent

UNITED STATES PATENTS

| 2,742,136 | Carroll | Apr. 17, 1956 |
| 2,853,108 | Hait | Sept. 23, 1958 |

FOREIGN PATENTS

| 146,178 | Australia | Jan. 26, 1950 |